United States Patent
Itakura et al.

(10) Patent No.: US 12,346,727 B2
(45) Date of Patent: Jul. 1, 2025

(54) NON-TRANSITORY COMPUTER-READABLE STORAGE MEDIUM, INFORMATION PROCESSING SYSTEM, AND DATA PROCESSING METHOD

(71) Applicant: FUJITSU LIMITED, Kawasaki (JP)

(72) Inventors: Kota Itakura, Kawasaki (JP);
Hisatoshi Yamaoka, Kawasaki (JP);
Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 588 days.

(21) Appl. No.: 17/569,243

(22) Filed: Jan. 5, 2022

(65) Prior Publication Data
US 2022/0308921 A1    Sep. 29, 2022

(30) Foreign Application Priority Data
Mar. 29, 2021    (JP) .................................. 2021-055737

(51) Int. Cl.
*G06F 9/48*    (2006.01)
*G06F 9/38*    (2018.01)

(52) U.S. Cl.
CPC .......... *G06F 9/4881* (2013.01); *G06F 9/3836* (2013.01)

(58) Field of Classification Search
None
See application file for complete search history.

(56) References Cited

U.S. PATENT DOCUMENTS

| | | | |
|---|---|---|---|
| 2019/0384502 A1* | 12/2019 | Sun ...................... | G06F 3/0611 |
| 2019/0384655 A1* | 12/2019 | Krishna Singuru .... | G06F 9/542 |
| 2020/0097376 A1 | 3/2020 | Zhao et al. | |
| 2020/0241944 A1* | 7/2020 | Derdak .................. | G06F 9/547 |

(Continued)

FOREIGN PATENT DOCUMENTS

| | | |
|---|---|---|
| JP | 2018-133105 | 8/2018 |
| WO | WO 2015/070232 A1 | 5/2015 |

OTHER PUBLICATIONS

J. M. Alves, L. M. Honório and M. A. M. Capretz, "ML4IoT: A Framework to Orchestrate Machine Learning Workflows on Internet of Things Data," in IEEE Access, vol. 7, pp. 152953-152967, 2019 (Year: 2019).*

(Continued)

Primary Examiner — Frank D Mills
(74) Attorney, Agent, or Firm — STAAS & HALSEY LLP

(57) ABSTRACT

A non-transitory computer-readable storage medium storing a program that causes a computer to execute a process. The process includes, in response to reception of a first dataset, starting to execute a task on the first dataset, when execution of the task involves execution of a first process requesting an access to information processing system, cancelling the execution of the task, and making the access to the information processing system for the first process, in response to reception of a second dataset, starting to execute the task on the second dataset, continuing the execution of the task on the second dataset when the execution of the task on the second dataset does not involve execution of the first process, and when an access result for the access is received, re-executing the task on the first dataset after the execution of the task on the second dataset is completed.

6 Claims, 27 Drawing Sheets

(56) References Cited

U.S. PATENT DOCUMENTS

2021/0064440 A1    3/2021  Klein et al.
2021/0349899 A1*  11/2021  Fink ................. G06F 16/24534

OTHER PUBLICATIONS

Office Action dated Nov. 20, 2023, issued in European Application No. 21 218 302.4.
European Search Report dated Jun. 13, 2022, in European Application No. 21218302.4.
European Office Action dated Jun. 19, 2024 for European Application No. 21218302.4.
Wikipedia: "Barrier (computer science)", Nov. 7, 2006 (Nov. 7, 2006), XP055272330, Retrieved from the Internet: URL:https://en.wikipedia.org/w/index.php?title=Barrier_(computer_science)&oldid=86330724 [retrieved on May 12, 2016].

* cited by examiner

FIG. 19

| TASK ID | DATASET ID | TIMESTAMP |
|---|---|---|
| #2 | 234567 | 123456780 |
| #3 | 345678 | 123456830 |

FIG. 20

| TASK NAME | TASK ID | TRANSMISSION SOURCE TASK ID | TRANSMISSION DESTINATION TASK ID | ORDER CONTROL | PROCESSING DETAILS |
|---|---|---|---|---|---|
| TASK T11 | #1 | - | #3 | YES | ... |
| TASK T12 | #2 | - | #3,#4 | NO | ... |
| TASK T13 | #3 | #1,#2 | #5 | NO | ... |
| TASK T14 | #4 | #2 | - | YES | ... |
| TASK T15 | #5 | #3 | - | NO | ... |

FIG. 21

| DATASET ID | TIMESTAMP | TRANSMISSION DESTINATION TASK ID | PRECEDING DATASET ID | DATA (1) | DATA (2) |
|---|---|---|---|---|---|
| 123456 | 123456789 | #3 | 234567 | 60 | 120 |

FIG. 22

| TASK ID | DATASET ID | PRECEDING DATASET ID | TIMESTAMP | DATA (1) | DATA (2) |
|---|---|---|---|---|---|
| #2 | 123456 | 234567 | 123456789 | 60 | 120 |
| #3 | 456789 | 345678 | 123456835 | 70 | 120 |

FIG. 23

| TASK ID | DATASET ID | TIMESTAMP | INDEX | RESPONSE |
|---------|------------|-----------|-------|----------|
| #2 | 234567 | 123456783 | 1 | aaa... |

FIG. 24

| TASK ID | DATASET ID | TIMESTAMP | SUBSEQUENT DATASET TRANSMISSION | INDEX | STATUS | REQUEST DESTINATION | RESPONSE |
|---|---|---|---|---|---|---|---|
| #2 | 234567 | 123456781 | NO | 1 | RECEIVED | http://... | aaa... |
| #2 | 234567 | 123456783 | NO | 2 | REQUESTING | http://... | - |
| #3 | 345678 | 123456832 | NO | 1 | RECEIVED | http://... | bbb... |

FIG. 25

| TASK ID | DATASET ID | TIMESTAMP | SUBSEQUENT DATASET TRANSMISSION | INDEX | STATUS | REQUEST DESTINATION | RESPONSE |
|---|---|---|---|---|---|---|---|
| #2 | 234567 | 123456781 | YES | 1 | RECEIVED | http://... | aaa... |
| #2 | 234567 | 123456783 | YES | 2 | REQUESTING | http://... | - |
| #3 | 345678 | 123456832 | NO | 1 | RECEIVED | http://... | bbb... |

FIG. 26

| TRANSMISSION DESTINATION TASK ID | DATASET ID | TIMESTAMP |
|---|---|---|
| #4 | 234567 | 123456780 |

FIG. 27

| TASK NAME | DATASET ID | TIMESTAMP | INDEX | REQUEST |
|---|---|---|---|---|
| #2 | 234567 | 123456781 | 1 | HTTP GET http://... |

NON-TRANSITORY COMPUTER-READABLE STORAGE MEDIUM, INFORMATION PROCESSING SYSTEM, AND DATA PROCESSING METHOD

CROSS-REFERENCE TO RELATED APPLICATION

This application is based upon and claims the benefit of priority of the prior Japanese Patent Application No. 2021-55737, filed on Mar. 29, 2021, the entire contents of which are incorporated herein by reference.

FIELD

The embodiment discussed herein is related to a non-transitory computer-readable storage medium, an information processing system, and a data processing method.

BACKGROUND

In recent years, there has been used a stream processing system which executes multiple tasks (task programs) in a chain manner on Internet of Thing (IoT) data received from multiple sensors and the like and outputs the processed data.

Such a stream processing system acquires a processing result in a different information processing system (also referred to as an external system below) by making an access to the different information processing system (also referred to as an external access below) depending on the necessity. For example, the stream processing system executes a task on data by using the acquired processing result.

Japanese Laid-open Patent Publication No. 2018-133105 is disclosed as related art.

SUMMARY

According to an aspect of the embodiments, a non-transitory computer-readable storage medium storing a data processing program that causes a processor included in a computer to execute a process, the process includes: in response to reception of a first dataset containing information on an event, starting to execute a first task on the received first dataset; when execution of the first task on the first dataset involves execution of a first process that requests an access to another information processing system, cancelling the execution of the first task on the first dataset, and making the access to the another information processing system for the first process; in response to reception of a second dataset containing information on an event, starting to execute the first task on the received second dataset; continuing the execution of the first task on the second dataset when the execution of the first task on the second dataset does not involve execution of the first process; and hen an access result for the access is received from the another information processing system, re-executing the first task on the first dataset after the execution of the first task on the second dataset is completed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a diagram for explaining a specific example of the preceding dataset management information;

FIG. 20 is a diagram for explaining a specific example of task management information;

FIG. 21 is a diagram for explaining a specific example of an inter-task dataset;

FIG. 22 is a diagram for explaining a specific example of waiting dataset management information;

FIG. 23 is a diagram for explaining a specific example of a response dataset;

FIG. 24 is a diagram for explaining a specific example of request management information;

FIG. 25 is a is a diagram for explaining a specific example of request management information;

FIG. 26 is a diagram for explaining a specific example of a task completion dataset; and FIG. 27 is a diagram for explaining a specific example of a request dataset.

DESCRIPTION OF EMBODIMENTS

For example, in a case of making an access to a different information processing system in response to execution of a task on certain data, the stream processing system suspends execution of the task on subsequent data until execution of a process using a processing result in the different information processing system is completed.

For this reason, the stream processing system may face a case where the processing speed decreases not only in execution of a task on data that requests an access to a different information processing system but also in execution of the task on data that does not request an access to a different information processing system.

One aspect of the embodiment has an object to provide a data processing program, an information processing system, and a data processing method capable of suppressing a decrease in a processing speed of a task on data that does not involve an access to a different information processing system.

Configuration of Information Processing System in First Embodiment

Figure 1:
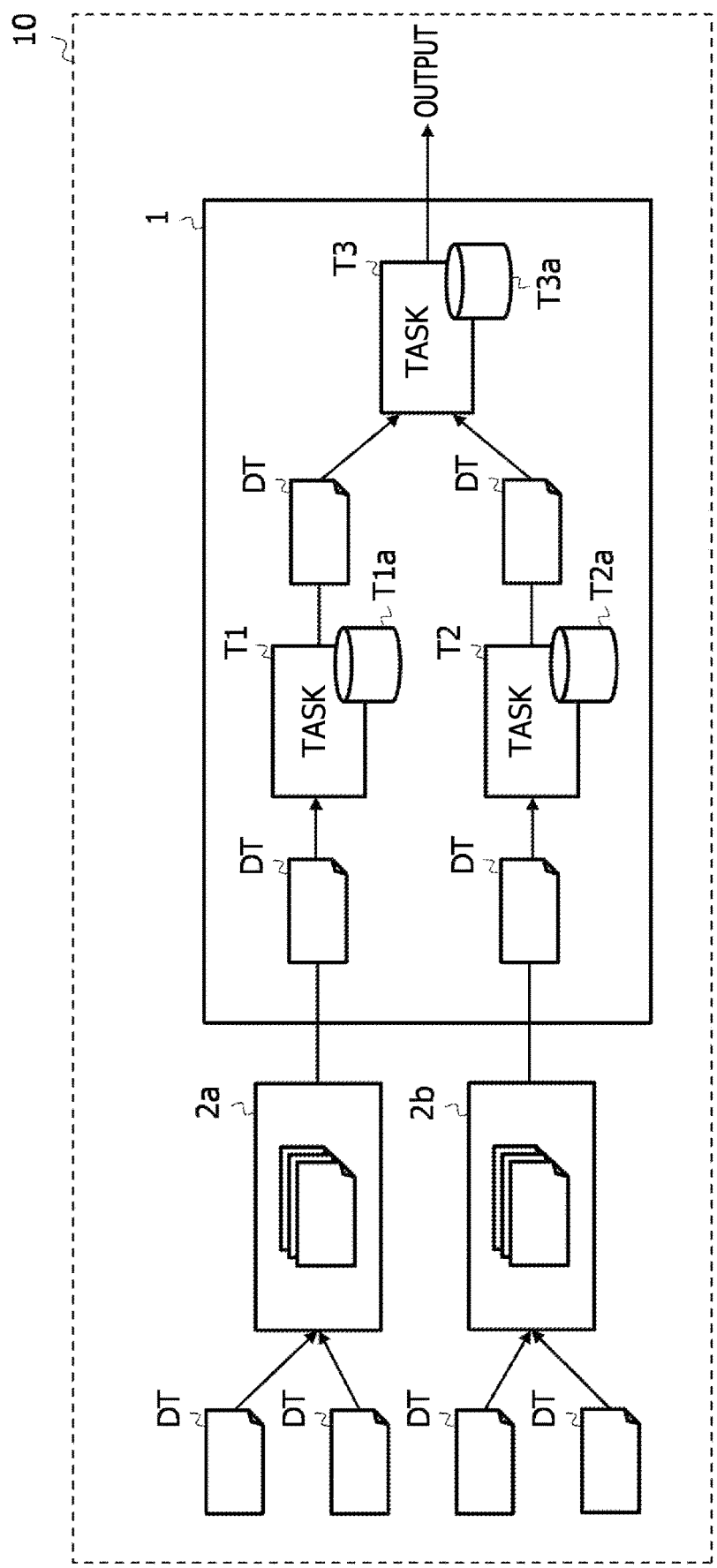
FIG. 1 is a diagram for explaining a configuration of an information processing system.

First, a configuration of an information processing system 10 will be described. FIG. 1 is a diagram for explaining the configuration of the information processing system 10.

The information processing system 10 includes, for example, a storage device 2a and a storage device 2b that store sensor datasets DT transmitted from multiple sensors (not illustrated), and an information processing apparatus 1 including one or more physical machines that execute tasks on the sensor datasets DT stored in the storage device 2a and the storage device 2b. For example, the sensor datasets DT are datasets about events such as a temperature change in a factory and a traffic jam condition on a road. Hereinafter, the storage device 2a and the storage device 2b are also simply collectively referred to as the storage device 2.

For example, as illustrated in FIG. 1, the information processing apparatus 1 performs processing of executing a task T1, a task T2, and a task T3 on the sensor datasets DT in a chain manner (hereafter, also referred to as stream processing).

For example, as illustrated in FIG. 1, the information processing apparatus 1 executes the task T1 on the sensor datasets DT stored in the storage device 2a and executes the task T2 on the sensor datasets DT stored in the storage device 2b. For example, the information processing apparatus 1 executes the task T3 on the sensor datasets DT after the execution of the task T1 (an execution result of the task T1) and the sensor datasets DT after the execution of the task T2 (an execution result of the task T2). After that, for example, the information processing apparatus 1 outputs the sensor datasets DT after the execution of the task T3 (an execution result of the task T3) to an operation terminal (not illustrated) or the like specified in advance.

For example, the stream processing including the task T1, the task T2, and the task T3 may be performed in parallel by multiple information processing apparatuses 1. For example, the multiple information processing apparatuses 1 may perform distributed stream processing of executing the task T1, the task T2, and the task T3 on the sensor datasets DT in parallel. Each of the task T1, the task T2, and the task T3 may be shared and executed by the multiple information processing apparatuses 1, for example.

For example, as illustrated in FIG. 1, the information processing apparatus 1 includes a storage device T1a that stores an internal state such as an execution result of the task T1 (hereafter also referred to as the internal state of the task T1), a storage device T2a that stores an internal state such as an execution result of the task T2 (hereafter also referred to as the internal state of the task T2), and a storage device T3a that stores an internal state such as an execution result of the task T3 (hereafter also referred to as the internal state of the task T3).

For example, the information processing system 10 saves the internal states of the tasks at regular time intervals in order to ensure the fault tolerance. For example, the information processing system 10 saves the internal states of the tasks in accordance with a distributed checkpoint method of saving the internal states of the tasks on a task-by-task basis.

For example, in a case where a failure such as disconnection of a network occurs, the information processing system 10 restores the states before the failure occurrence by using the saved internal states, and executes the tasks again from the restored states. Hereinafter, the distributed checkpoint method will be described.

[Distributed Checkpoint]

FIGS. 2 to 7 are diagrams for explaining the distributed checkpoint method.

In the information processing apparatus 1, a barrier marker (hereafter, also referred to as a specific type of data) is transmitted and received between tasks in order to notify each of the tasks of a timing for saving the internal state thereof. For example, each task saves the internal state of the task in response to reception of the barrier marker.

Figure 2:
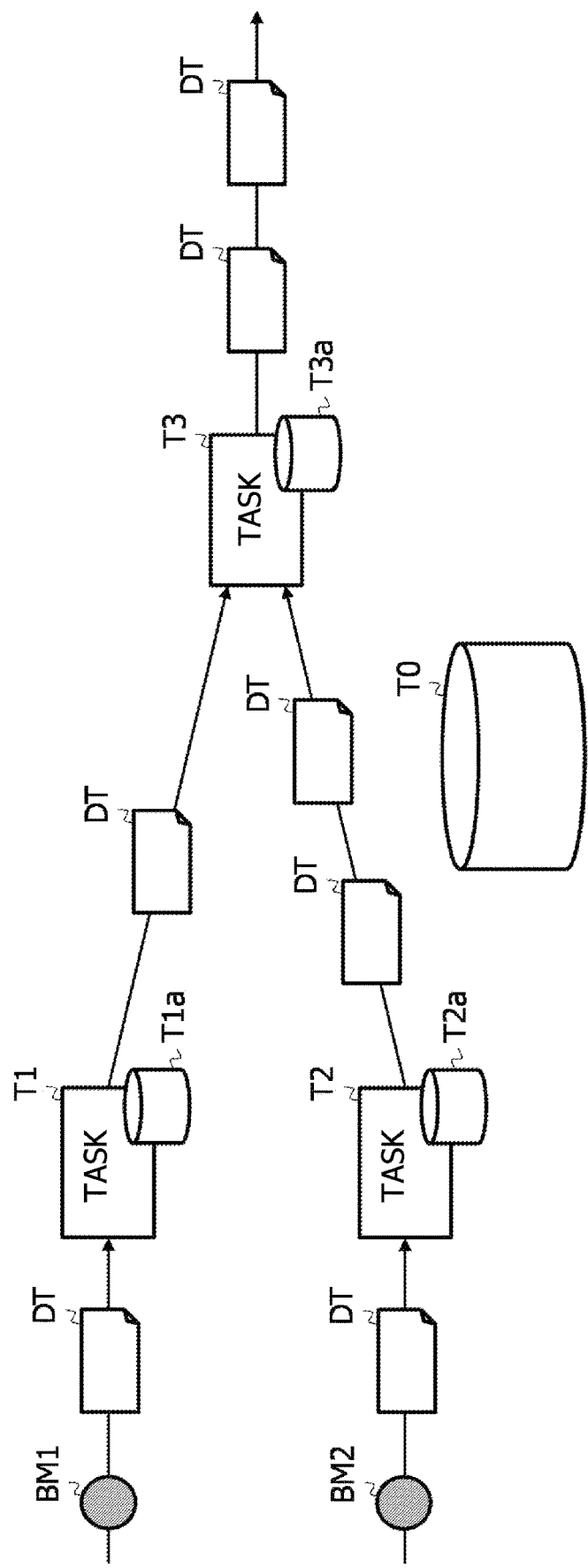
FIG. 2 is a diagram for explaining a distributed checkpoint method.

For example, as illustrated in FIG. 2, in the information processing apparatus 1, a barrier marker BM1 and a barrier marker BM2 are transmitted and received at regular time intervals together with the sensor datasets DT. The barrier marker BM1 is a barrier marker transmitted to the task T3 via the task T1, and the barrier marker BM2 is a barrier marker transmitted to the task T3 via the task T2.

Figure 3:
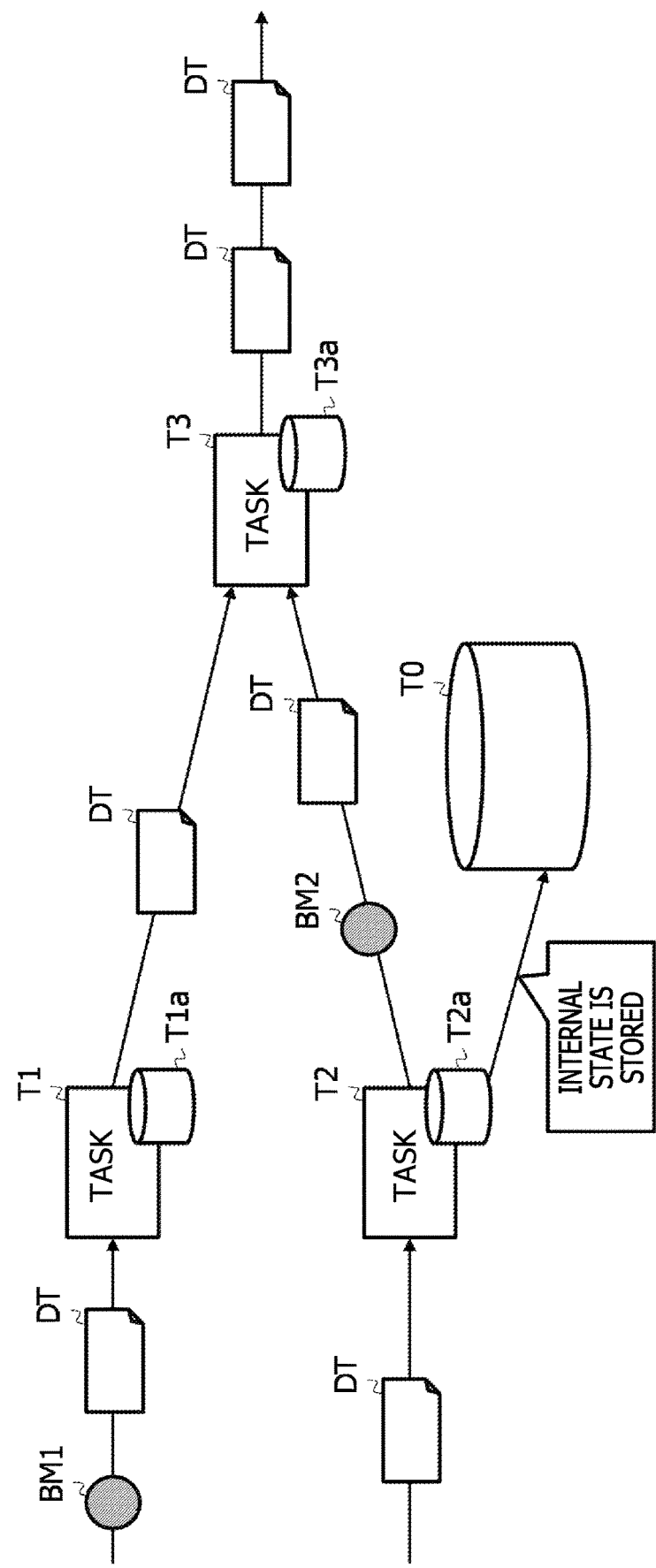
FIG. 3 is a diagram for explaining the distributed checkpoint method.

For example, as illustrated in FIG. 3, when the barrier marker BM2 reaches the task T2, the task T2 stores the internal state stored in the storage device T2a at the time of the reception of the barrier marker BM2 in a storage device T0.

Figure 4:
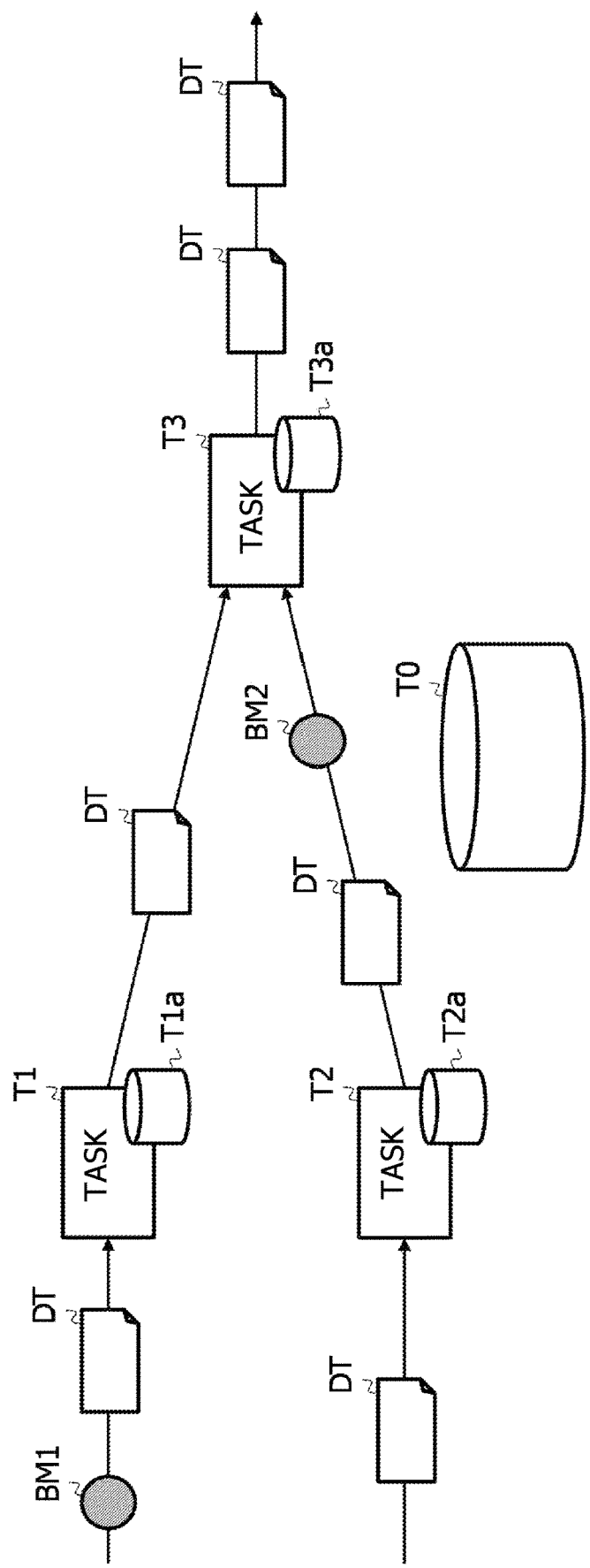
FIG. 4 is a diagram for explaining the distributed checkpoint method.

Thereafter, for example, as illustrated in FIG. 4, when the barrier marker BM2 reaches the task T3, the task T3 waits until the barrier marker BM1 reaches the task T3.

For example, the task T3 is a task to be executed on the sensor dataset DT after the execution of the task T1 (the execution result of the task T1) and the sensor dataset DT after the execution of the task T2 (the execution result of the task T2). For this reason, the task T3 waits until the barrier markers reach the task T3 from all the transmission sources (the tasks T1 and T2) to transmit the sensor datasets DT to the task T3.

After that, for example, when the barrier marker BM1 reaches the task T1, the task T1 stores the internal state stored in the storage device T1a at the time of the reception of the barrier marker BM1 in the storage device TO.

Figure 5:
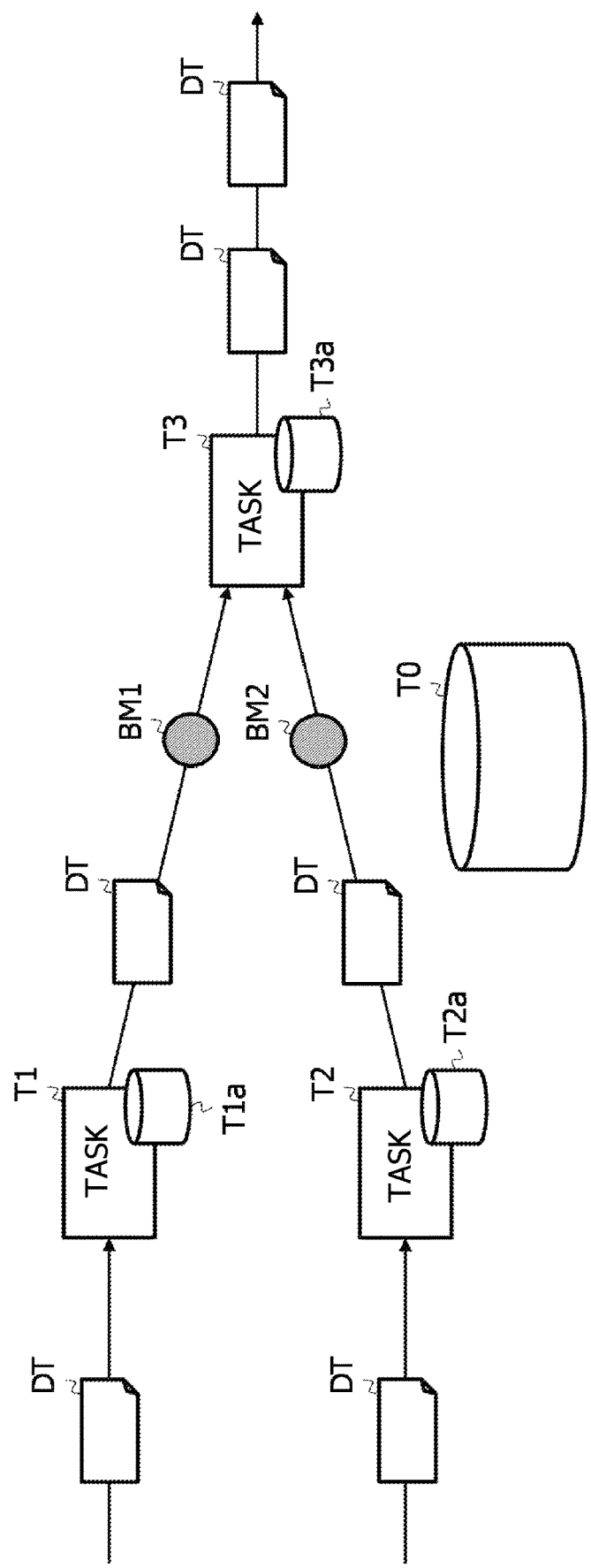
FIG. 5 is a diagram for explaining the distributed checkpoint method.
Figure 6:
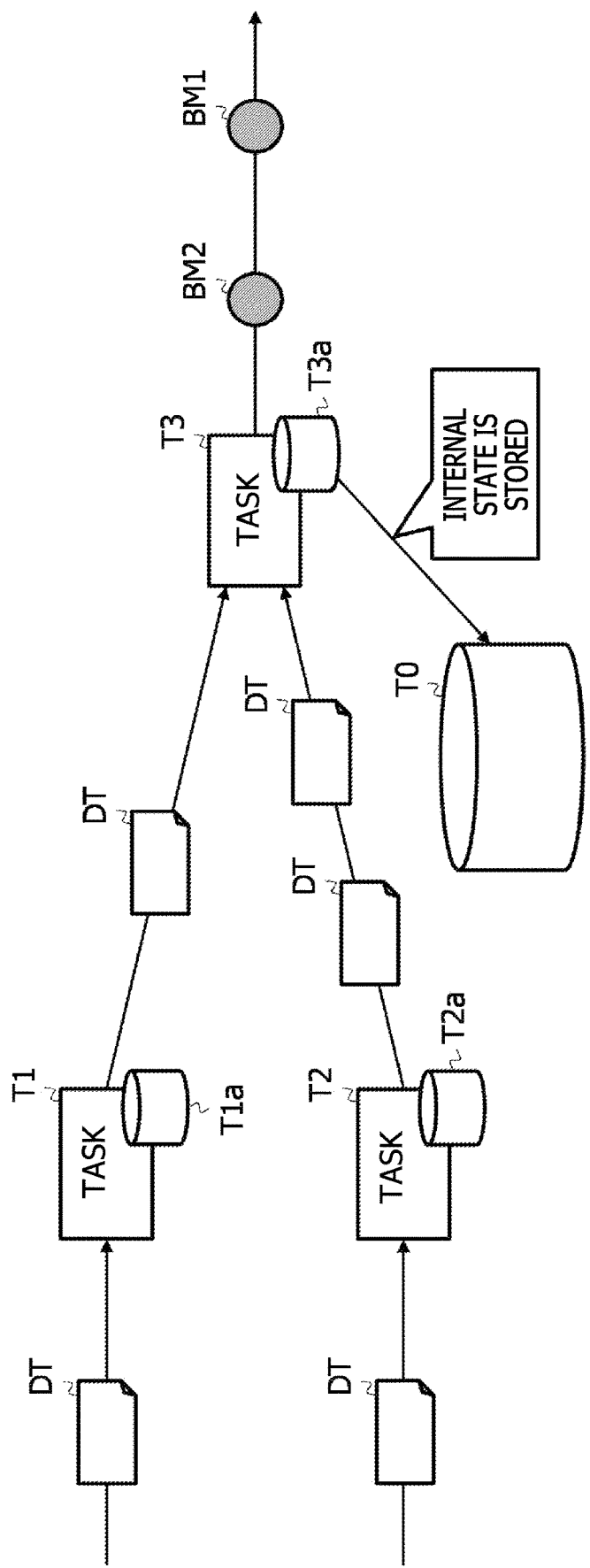
FIG. 6 is a diagram for explaining the distributed checkpoint method.

For example, when the barrier marker BM1 reaches the task T3 as illustrated in FIG. 5, the task T3 determines that the barrier markers reach the task T3 from all the transmission sources of the sensor datasets DT to the task T3, and stores the internal state stored in the storage device T3a at the time of the reception of the barrier marker BM1 in the storage device TO as illustrated in FIG. 6.

In this way, the sensor datasets DT processed by the tasks before the internal states are saved may be made consistent among the tasks. For this reason, even in a case where the information processing apparatus 1 restores the past states (the states before a failure occurrence) by using the internal states of the tasks, the information processing apparatus 1 is able to avoid re-execution of any of the tasks on the same sensor dataset DT before and after the restoration, and thereby reduce the occurrence of an inconsistency before and after the restoration.

Figure 7:
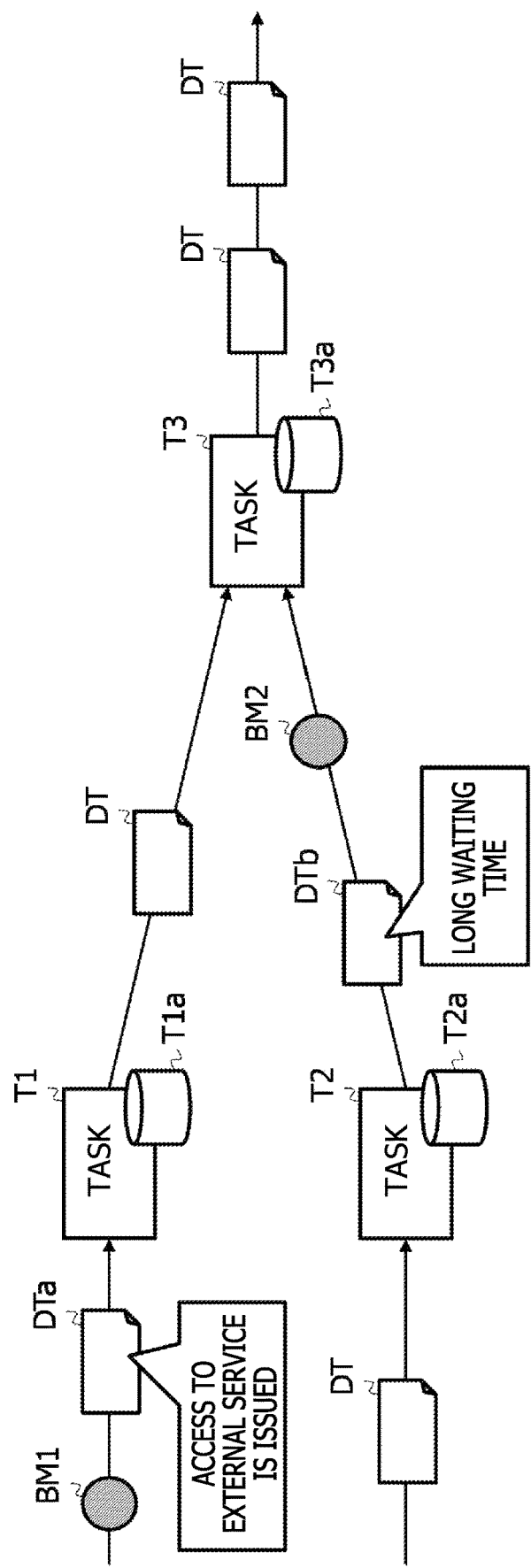
FIG. 7 is a diagram for explaining the distributed checkpoint method.

For example, as illustrated in FIG. 7, when an access to an external system (not illustrated) is occurred along with execution of the task T1 on a sensor dataset DTa preceding to the barrier marker BM1, the task T1 has to wait until reception of an access result (processing result) from the external system. For this reason, the task T1 is not enabled to perform the processing on the dataset subsequent to the sensor dataset DTa until the task T1 receives the access result from the external system and completes the processing on the sensor dataset DTa by using the received access result.

Accordingly, for example, when it takes time to make the access to the external system, the task T3 has to wait for the barrier marker BM1 for a long time. In this case, in the task T3, the processing speed decreases not only for a sensor dataset DT that requests an access to the external system (for example, the sensor dataset DTa), but also for a sensor dataset DT that does not request an access to an external system (for example, a sensor dataset DTb subsequent to the barrier marker BM2).

To address this, for example, in response to reception of a sensor dataset DT containing information on an event (hereafter, also referred to as a first sensor dataset DT or first dataset DT), the information processing apparatus 1 according to the present embodiment starts to execute a task (hereafter, also referred to as a first task) on the received first sensor dataset DT. For example, when the execution of the first task on the first sensor dataset DT involves execution of a process that requests an access to an external system (hereafter, also referred to as a first process), the information processing apparatus 1 cancels the execution of the first task on the first sensor dataset DT and accesses the external system for the first process.

Subsequently, for example, in response to reception of a sensor dataset DT containing information on an event (hereafter, also referred to as a second sensor dataset DT or second dataset DT), the information processing apparatus 1 starts to execute the first task on the received second sensor dataset DT. For example, when the execution of the first task on the second sensor dataset DT does not involve execution of the first process, the information processing apparatus 1 continues the execution of the first task on the second sensor dataset DT.

After that, for example, when the information processing apparatus 1 receives an access result from the external system, the information processing apparatus 1 re-executes the first task on the first sensor dataset DT after the execution of the first task on the second sensor dataset DT is completed.

For example, when an access to the external system is occurred along with the execution of the first task on the first sensor dataset DT, the information processing apparatus 1 cancels the execution of the first task on the first sensor dataset DT and makes the occurred access to the external system asynchronously with the execution of the first task on the first sensor dataset DT. Without waiting for the access result from the external system, the information processing apparatus 1 executes the first task sequentially on sensor datasets DT (including the second sensor dataset DT) generated after the first sensor dataset DT. After that, when the information processing apparatus 1 receives the access result from the external system, the information processing apparatus 1 re-executes the first task on the first sensor dataset DT from the beginning by using the received access result.

In this way, for example, the information processing apparatus 1 is capable of reducing the waiting time for the barrier marker, which occurs due to an access to the external system. Thus, the information processing apparatus 1 is capable of suppressing a decrease in the processing speed of a task on the sensor dataset DT that does not involve an access to an external system.

For example, the information processing apparatus 1 is capable of suppressing a decrease in the processing speed for a sensor dataset DT subsequent to a sensor dataset DT that involves an access to an external system (for example, the sensor dataset DTa illustrated in FIG. 7). The information processing apparatus 1 is capable of suppressing a decrease in the processing speed for a certain barrier marker (for example, the barrier marker BM1 illustrated in FIG. 7) subsequent to a sensor dataset DT that involves an access to an external system, and thereby suppressing a decrease in the processing speed for a sensor dataset DT (for example, the sensor dataset DTb illustrated in FIG. 7) subsequent to another barrier marker (for example, the barrier marker BM2 illustrated in FIG. 7) that waits for the certain barrier marker.

Hereinafter, description will be given on the assumption that processing in each task does not include randomness. For example, the description will be given on the assumption that, when each task receives the same sensor dataset DT in the same state, the task performs the same processing and outputs the same execution result.

[Hardware Structure of Information Processing System]

Figure 8:
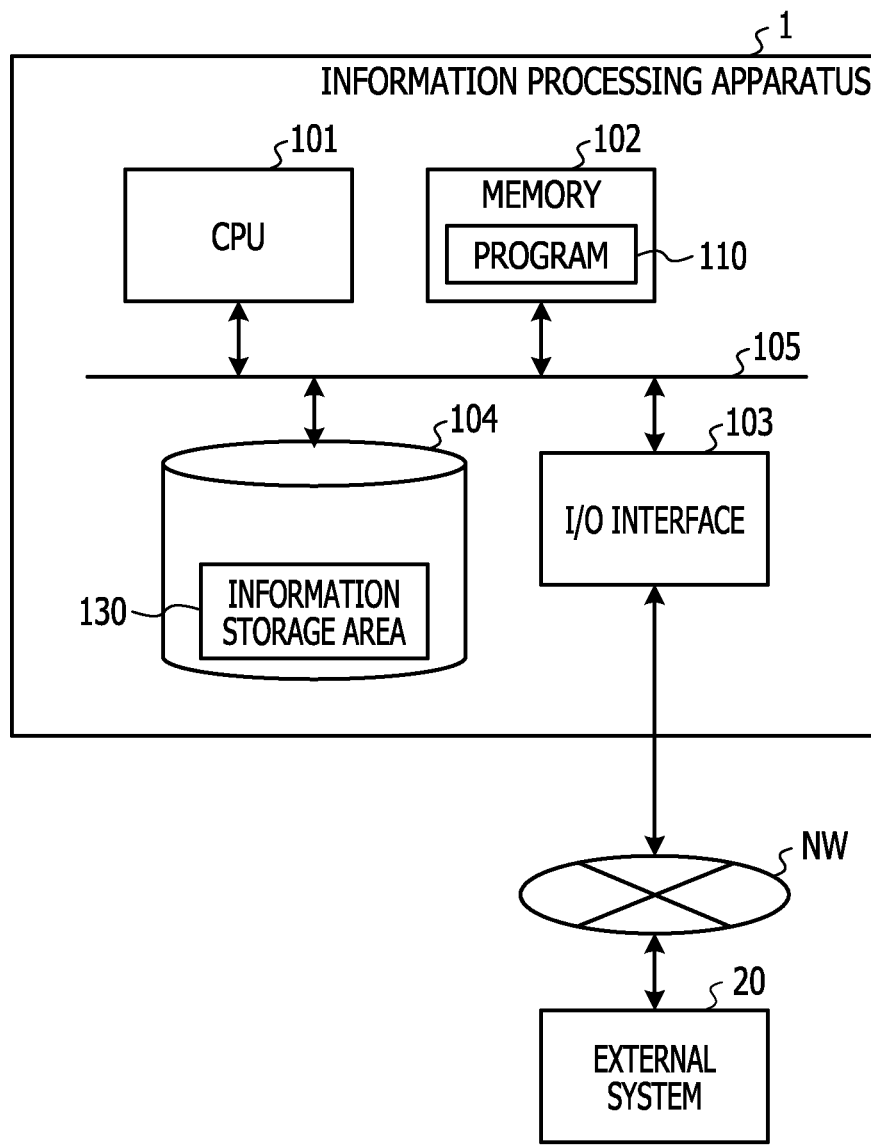
FIG. 8 is a diagram for explaining a hardware structure of an information processing apparatus.

Next, a hardware structure of the information processing system 10 will be described. FIG. 8 is a diagram for explaining the hardware structure of the information processing apparatus 1.

As illustrated in FIG. 8, the information processing apparatus 1 includes a CPU 101, which is a processor, a memory 102, an input/output (I/O) interface 103, and a storage medium 104. These units are coupled to each other via a bus 105.

For example, the storage medium 104 has a program storage area (not illustrated) for storing a program 110 for performing processing of sequentially executing multiple tasks on sensor datasets DT (hereafter, also referred to as stream data processing or data processing). For example, the storage medium 104 has an information storage area 130 for storing information to be used for performing the stream data processing. The storage medium 104 may be, for example, a hard disk drive (HDD) or a solid-state drive (SSD).

The CPU 101 performs the stream data processing by executing the program 110 loaded from the storage medium 104 to the memory 102.

For example, the I/O interface 103 is an interface device such as a network interface card, and is capable of accessing an external system 20 via a network NW such as the Internet. For example, the external system 20 may be a database system which manages various kinds of data that the information processing apparatus 1 does not store as the internal states of the tasks.

[Functions of Information Processing System]

Figure 9:
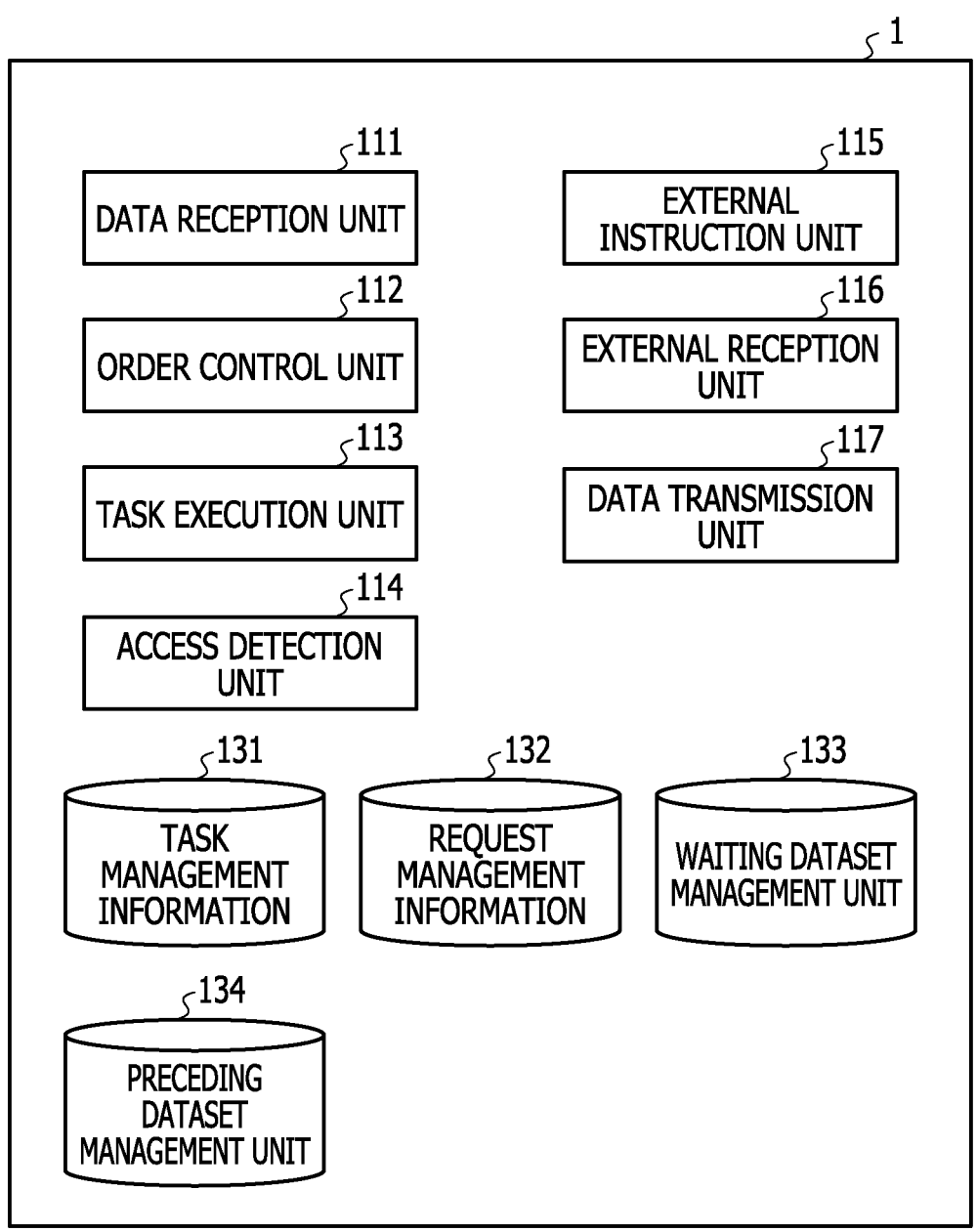
FIG. 9 is a block diagram of functions of the information processing apparatus.

Next, functions of the information processing system 10 will be described. FIG. 9 is a block diagram of functions of the information processing apparatus 1.

As illustrated in FIG. 9, the information processing apparatus 1 implements various functions including a data reception unit 111, an order control unit 112, a task execution unit 113, an access detection unit 114, an external instruction unit 115, an external reception unit 116, and a data transmission unit 117 through organic collaboration of hardware such as the CPU 101 and the memory 102 with the program 110, for example.

For example, the information processing apparatus 1 stores task management information 131, request management information 132, waiting dataset management information 133, and preceding dataset management information 134 in the information storage area 130.

Hereinafter, the description will be given on the assumption that all of the data reception unit 111, the order control unit 112, the task execution unit 113, the access detection unit 114, the external instruction unit 115, the external reception unit 116, and the data transmission unit 117 are provided for each task. Alternatively, in the information processing apparatus 1, the task execution unit 113 and the access detection unit 114 may be provided for each task, whereas only one data reception unit 111, one order control unit 112, one external instruction unit 115, one external reception unit 116, and one data transmission unit 117 may be provided.

For example, the data reception unit 111 sequentially acquires sensor datasets DT stored in the storage device 2. For example, the data reception unit 111 receives the sensor datasets DT transmitted from a task at the previous stage (the task at the previous stage running in the same information processing apparatus 1 or another information processing apparatus 1).

For example, the order control unit 112 controls the processing order of the sensor datasets DT received by the data reception unit 111.

For example, the task execution unit 113 executes a task on a sensor dataset DT received by the data reception unit 111.

For example, the access detection unit 114 detects an access to the external system 20 being made along with the execution of the task by the task execution unit 113.

For example, when the access detection unit 114 detects the issuance of the access to the external system 20, the external instruction unit 115 makes the access to the external system 20 instead of the task execution unit 113. In this case, the task execution unit 113 cancels the execution of the task (task in execution) on the sensor dataset DT received by the data reception unit 111.

For example, the external reception unit 116 receives an access result transmitted by the external system 20 (an access result for the access to the external system 20 made by the external instruction unit 115). In this case, the task execution unit 113 executes the task on the sensor dataset DT received by the data reception unit 111 from the beginning by using the access result received by the external reception unit 116. For example, the task execution unit 113 re-executes the task on the sensor dataset DT received by the data reception unit 111, including a process the execution of which had been completed before the cancellation.

For example, the data transmission unit 117 transmits the sensor dataset DT processed by the task execution unit 113 (an execution result by the task execution unit 113) to a task at the subsequent stage (the task at the subsequent stage running in the same information processing apparatus 1 or another information processing apparatus 1). For example, the data transmission unit 117 outputs the sensor dataset DT processed by the task execution unit 113 to an operation terminal (not illustrated) specified in advance as a final result.

The task management information 131, the request management information 132, the waiting dataset management information 133, and the preceding dataset management information 134 will be described later.

Overview of First Embodiment

Figure 10:
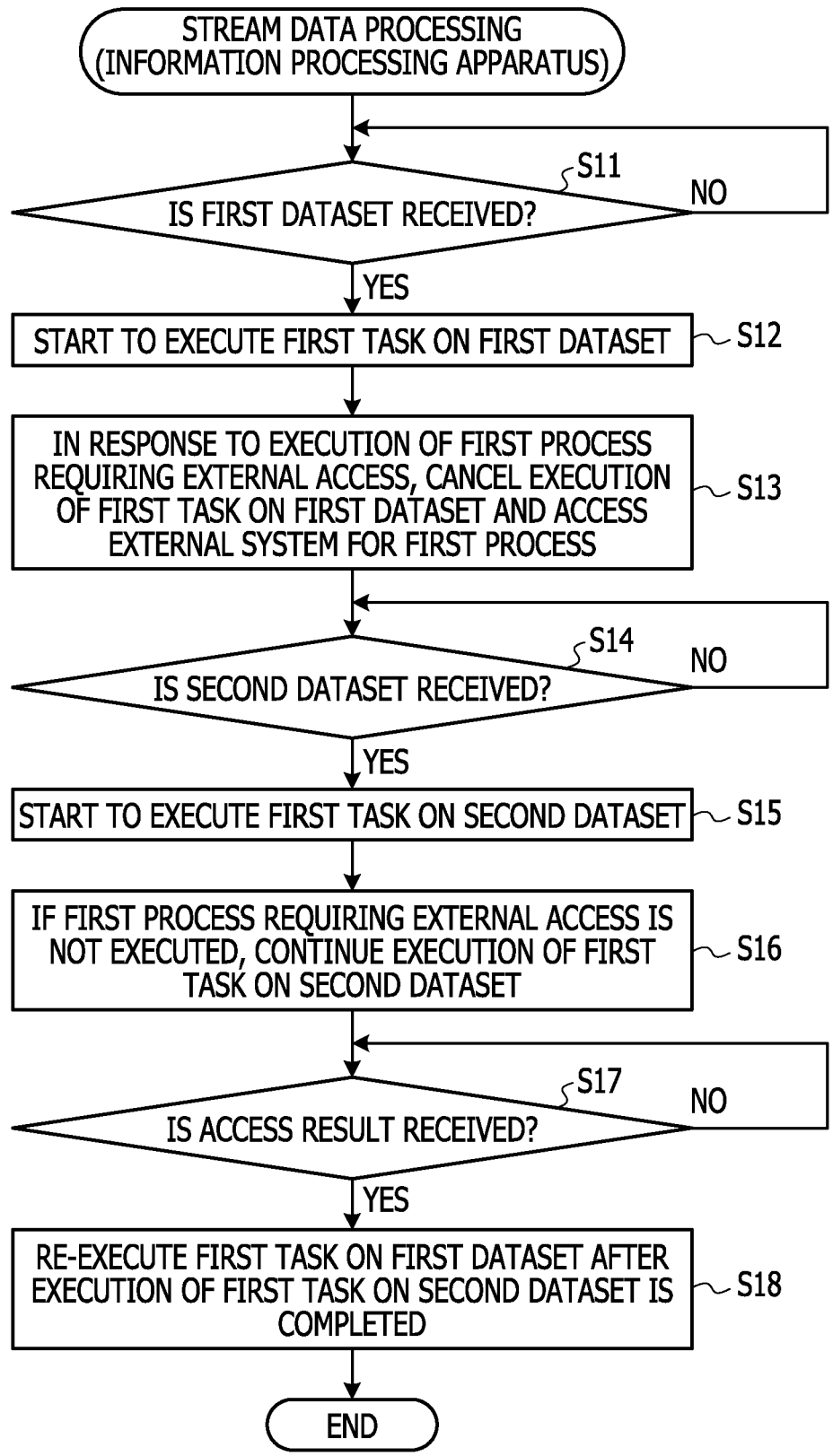
FIG. 10 is a flowchart diagram for explaining an overview of stream data processing in a first embodiment.
Figure 11:
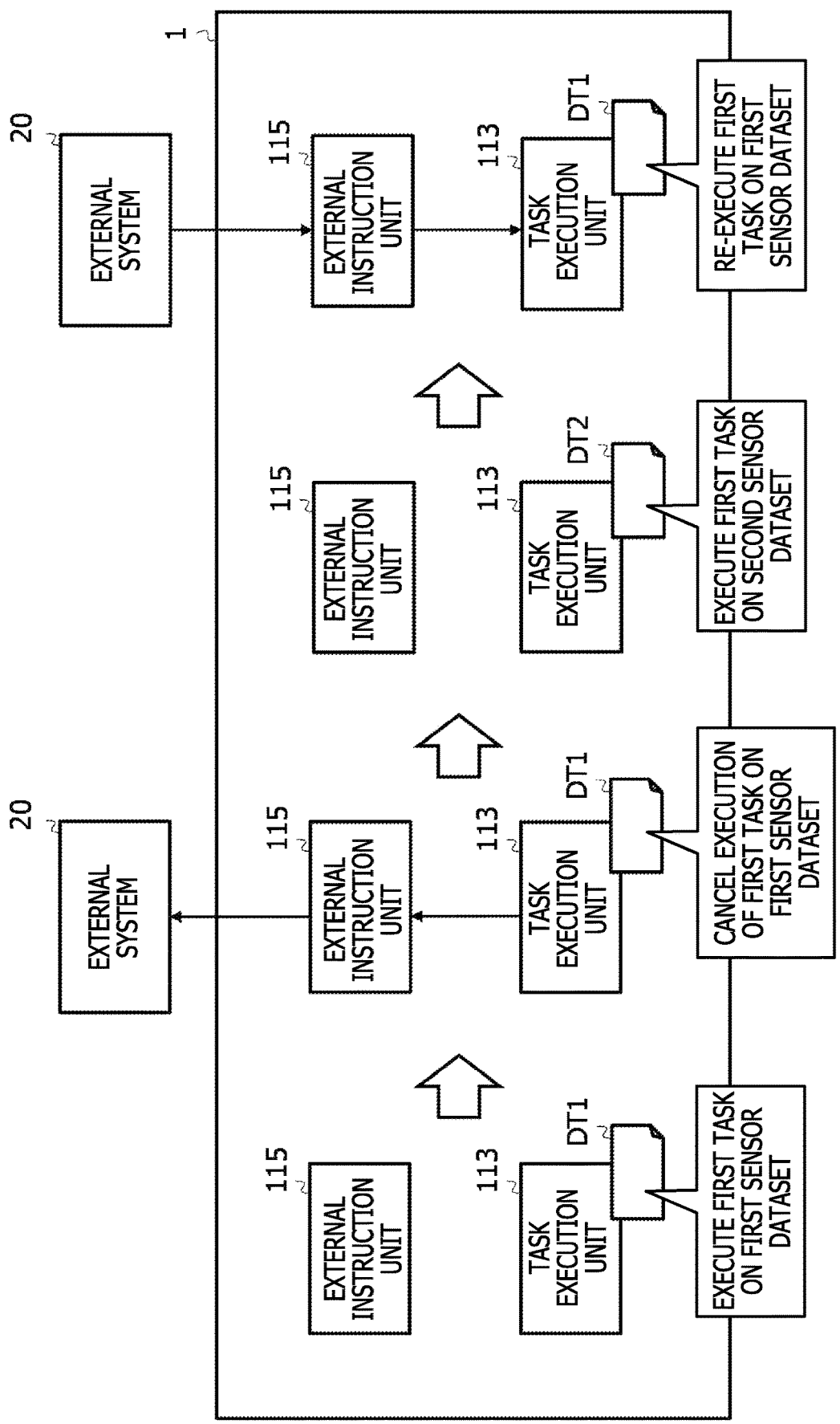
FIG. 11 is a diagram for explaining the overview of the stream data processing in the first embodiment.

Next, an overview of a first embodiment will be described. FIG. 10 is a flowchart diagram for explaining an overview of stream data processing in the first embodiment. FIG. 11 is a diagram for explaining the overview of the stream data processing in the first embodiment. Hereinafter, description will be given of processing performed in one task running in the information processing apparatus 1.

As illustrated in FIG. 10, for example, the information processing apparatus 1 waits until reception of a first sensor dataset DT (NO at S11).

When receiving the first sensor dataset DT (YES at S11), the information processing apparatus 1 starts to execute the first task on the first sensor dataset DT (S12).

Subsequently, when the execution of the first task on the first sensor dataset DT involves execution of a first process that requests an access to the external system 20, the information processing apparatus 1 cancels the execution of the first task on the first sensor dataset DT and makes the access to the external system 20 for the first process (S13).

After that, for example, the information processing apparatus 1 waits until reception of a second sensor dataset DT (NO at S14).

When receiving the second sensor dataset DT (YES at S14), the information processing apparatus 1 starts to execute the first task on the second sensor dataset DT (S15).

Then, when the execution of the first task on the second sensor dataset DT does not involve execution of the first process that requests an access to the external system 20, the information processing apparatus 1 continues the execution of the first task on the second sensor dataset DT (S16). In this case, for example, the information processing apparatus 1 does not cancel the execution of the first task on the second sensor dataset DT unlike the processing at S13.

The information processing apparatus 1 waits until reception of an access result for the access to the external system 20 made in the processing at S13 (NO at S17).

When receiving the access result for the access to the external system 20 made in the processing at S13 (YES at S17), the information processing apparatus 1 re-executes the first task on the first sensor dataset DT after the execution of the first task on the second sensor dataset DT is completed (S18).

In this way, for example, the information processing apparatus 1 is capable of reducing a waiting time for a barrier marker, which occurs due to an access to the external system 20. Thus, the information processing apparatus 1 is capable of suppressing a decrease in the processing speed of a task on a sensor dataset DT that does not involve an access to the external system 20.

For example, when a first sensor dataset DT (hereafter, also referred to as the first sensor dataset DT1) is received, the task execution unit 113 executes the first task on the first sensor dataset DT1 as in the first state from the left in FIG. 11.

When it is detected that the execution of the first task involves an access to the external system 20, the task execution unit 113 cancels the execution of the first task on the first sensor dataset DT1 as in the second state from the left in FIG. 11. In this case, the external instruction unit 115 makes the access to the external system 20 instead of the task execution unit 113.

For example, when an access to the external system 20 is occurred, the information processing apparatus 1 causes the external instruction unit 115 to execute the access to the external system 20 instead of the task execution unit 113 that continuously performs the stream processing on each of the sensor datasets DT.

Then, for example, when a second sensor dataset DT (hereafter, also referred to as the second sensor dataset DT2) is received, the task execution unit 113 executes the first task on the second sensor dataset DT2 as illustrated in the third state from the left in FIG. 11.

For example, in this case, the information processing apparatus 1 starts to execute the first task on the second sensor dataset DT2 (the second sensor dataset DT2 generated after the first sensor dataset DT1) without waiting for the completion of the execution of the first task on the first sensor dataset DT1.

After that, for example, in a case where the access result for the first sensor dataset DT1 has been received from the external system 20 when the execution of the first task on the second sensor dataset DT2 ends, the task execution unit 113 re-executes the first task on the first sensor dataset DT1 by using the access result received from the external system 20 as illustrated in the fourth state from the left in FIG. 11.

In this way, the information processing apparatus 1 is capable of reducing the influence of a processing delay due to the issuance of an access to the external system 20 on the processing (stream processing) in the task execution unit 113. Thus, the information processing apparatus 1 is capable of suppressing a decrease in the processing speed for a sensor dataset DT (for example, the second sensor dataset DT2) that does not involve an access to the external system 20.

Although the above example has been described for the case where the sensor dataset DT (for example, the second sensor dataset DT2) subsequent to the first sensor dataset DT1 arrives before the access result for the first sensor dataset DT1, the embodiment is not limited to the above case. For example, when the access result for the first sensor dataset DT1 is received before the arrival of the sensor dataset DT subsequent to the first sensor dataset DT1, the information processing apparatus 1 may start to re-execute the first task on the first sensor dataset DT1 without waiting for the arrival of the sensor dataset DT subsequent to the first sensor dataset DT1.

Details of First Embodiment

Next, details of the first embodiment will be described. FIG. 12 to 18 are flowchart diagrams for explaining details of the stream data processing in the first embodiment. FIGS. 19 to 27 are diagrams for explaining the details of the stream data processing in the first embodiment. The following description will be given of processing performed for a certain one of tasks running in multiple information processing apparatuses 1.

Figure 12:
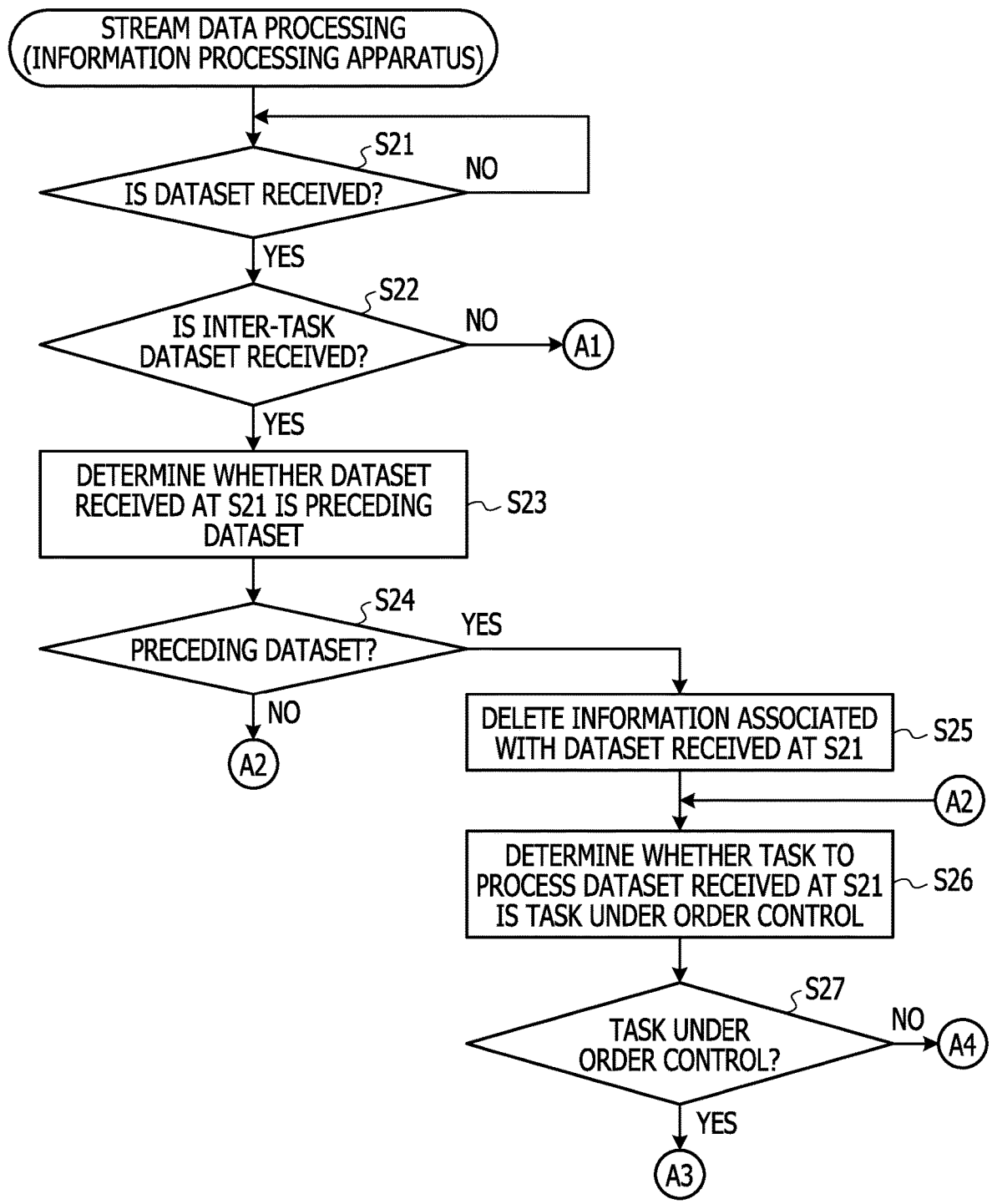
FIG. 12 is a flowchart diagram for explaining details of the stream data processing in the first embodiment.

As illustrated in FIG. 12, the data reception unit 111 waits until reception of a dataset (NO at S21).

For example, the data reception unit 111 waits until reception of a sensor dataset DT transmitted from a task at the previous stage (hereafter, also referred to as an inter-task dataset DT11). For example, the data reception unit 111 waits until reception of a dataset indicating that a sensor dataset DT will not be transmitted any more from the task at the previous stage (hereafter, also referred to as a task completion dataset DT12). For example, the data reception unit 111 waits until reception of an access result transmitted from the external system 20 (hereafter, also referred to as a response dataset DT14).

When the data reception unit 111 receives a dataset (YES at S21), the order control unit 112 determines whether or not the dataset received in the processing at S21 is an inter-task dataset DT11 (S22).

When determining as a result that the dataset received in the processing at S21 is the inter-task dataset DT11 (YES at S22), the order control unit 112 determines whether or not the inter-task dataset DT11 received in the processing at S21 is a preceding dataset (S23). The preceding dataset is an inter-task dataset DT11 on which the execution of the task is canceled due to the issuance of an access to the external system 20. For example, the preceding dataset is the inter-task dataset DT11 on which the execution of the task is completed after that of another later-generated inter-task dataset DT11 due to the issuance of the access to the external system 20, and is the inter-task dataset DT11, whose execution result the task at the subsequent stage waits for to arrive.

For example, the order control unit 112 refers to the preceding dataset management information 134 stored in the information storage area 130 and thereby determines whether or not there is information associated with the inter-task dataset DT11 received in the processing at S21. The preceding dataset management information 134 is information for managing a preceding dataset which each task waits for to arrive from a task at the previous stage. When determining as a result that there is the information associated with the inter-task dataset DT11 received in the processing at S21, the order control unit 112 determines that the inter-task dataset DT11 received in the processing at S21 is the preceding dataset.

When determining that the inter-task dataset DT11 received in the processing at S21 is the preceding dataset (YES at S24), the order control unit 112 refers to the preceding dataset management information 134 stored in the information storage area 130, and deletes the information associated with the inter-task dataset DT11 received in the processing at S21 (S25). Hereinafter, a specific example of the preceding dataset management information 134 will be described.

Specific Example of Preceding Dataset Management Information

FIG. 19 is a diagram for explaining the specific example of the preceding dataset management information 134.

The preceding dataset management information 134 illustrated in FIG. 19 contains "task ID" for identifying each task, "dataset ID" for identifying each sensor dataset DT as a preceding dataset, and "timestamp" for indicating a time at which each sensor dataset DT was generated in a sensor. Hereinafter, tasks having the "task ID" of "#1", "#2", "#3", "#4", and "#5" are referred to as task #1, task #2, task #3, task #4, and task #5, respectively.

For example, in the information in the first row of the preceding dataset management information 134 illustrated in FIG. 19, "#2" is set as the "task ID", "234567" is set as the "dataset ID", and "123456780" is set as the "timestamp".

In the information in the second row of the preceding dataset management information 134 illustrated in FIG. 19, "#3" is set as the "task ID", "345678" is set as the "dataset ID", and "123456830" is set as the "timestamp".

For example, the preceding dataset management information 134 illustrated in FIG. 19 indicates that the task #2 waits for reception of the preceding dataset with the "dataset ID" of "234567" and the task #3 waits for reception of the preceding dataset with the "dataset ID" of "345678".

Returning to FIG. 12, when determining that the inter-task dataset DT11 received in the processing at S21 is not the preceding dataset (NO at S24), the order control unit 112 skips the processing at S25.

For example, the order control unit 112 refers to the task management information 131 stored in the information storage area 130, and thereby determines whether or not the task (the certain task) to process the inter-task dataset DT11 received in the processing at S21 is a task to be under the order control (S26). Hereinafter, a specific example of the task management information 131 will be described.

Specific Example of Task Management Information

FIG. 20 is a diagram for explaining a specific example of the task management information 131.

The task management information 131 illustrated in FIG. 20 contains "task name" for setting the name of each task, "task ID" for identifying each task, "transmission source task" for setting a transmission source task (a task at the previous stage) that transmits a sensor dataset DT to each task, and "transmission destination task" for setting a transmission destination task (a task at the subsequent stage) to which each task transmits a sensor dataset DT. The task management information 131 illustrated in FIG. 20 contains "order control" for indicating whether or not control of the processing order of sensor datasets DT (hereafter, also referred to as the order control) has to be performed in each task, and "processing details" for setting processing details of each task. In the "order control", "YES" is set which indicates that the order control of sensor datasets DT has to be performed or "NO" is set which indicates that the order control of sensor datasets DT does not have to be performed.

For example, in the first row of the task management information 131 illustrated in FIG. 20, "task T11" is set as the "task name", "#1" is set as the "task ID", "-" indicating that no information is set is set as the "transmission source task ID", "#3" is set as the "transmission destination task ID", and "YES" is set as the "order control".

In the second row of the task management information 131 illustrated in FIG. 20, "task T12" is set as the "task name", "#2" is set as the "task ID", "-" is set as the "transmission source task ID", "#3 and #4" are set as the "transmission destination task ID", and "NO" is set as the "order control".

In the third row of the task management information 131 illustrated in FIG. 20, "task T13" is set as the "task name", "#3" is set as the "task ID", "#1" and "#2" are set as the "transmission source task ID", "#5" is set as the "transmission destination task ID", and "NO" is set as the "order control".

In the fourth row of the task management information 131 illustrated in FIG. 20, "task T14" is set as the "task name", "#4" is set as the "task ID", "#2" is set as the "transmission source task ID", "-" is set as the "transmission destination task ID", and "YES" is set as the "order control".

In the fifth row of the task management information 131 illustrated in FIG. 20, "task T15" is set as the "task name", "#5" is set as the "task ID", "#3" is set as the "transmission source task ID", "-" is set as the "transmission destination task ID", and "NO" is set as the "order control".

For example, the task management information 131 illustrated in FIG. 20 indicates that a sensor dataset DT on which the task #1 is executed and a sensor dataset DT on which the task #2 is executed are to be transmitted to the task #3, and a sensor dataset DT on which the task #3 is executed is to be transmitted to the task #5. The task management information 131 illustrated in FIG. 20 indicates that a sensor dataset DT on which the task #2 is executed is to be transmitted to the task #4.

Figure 13:
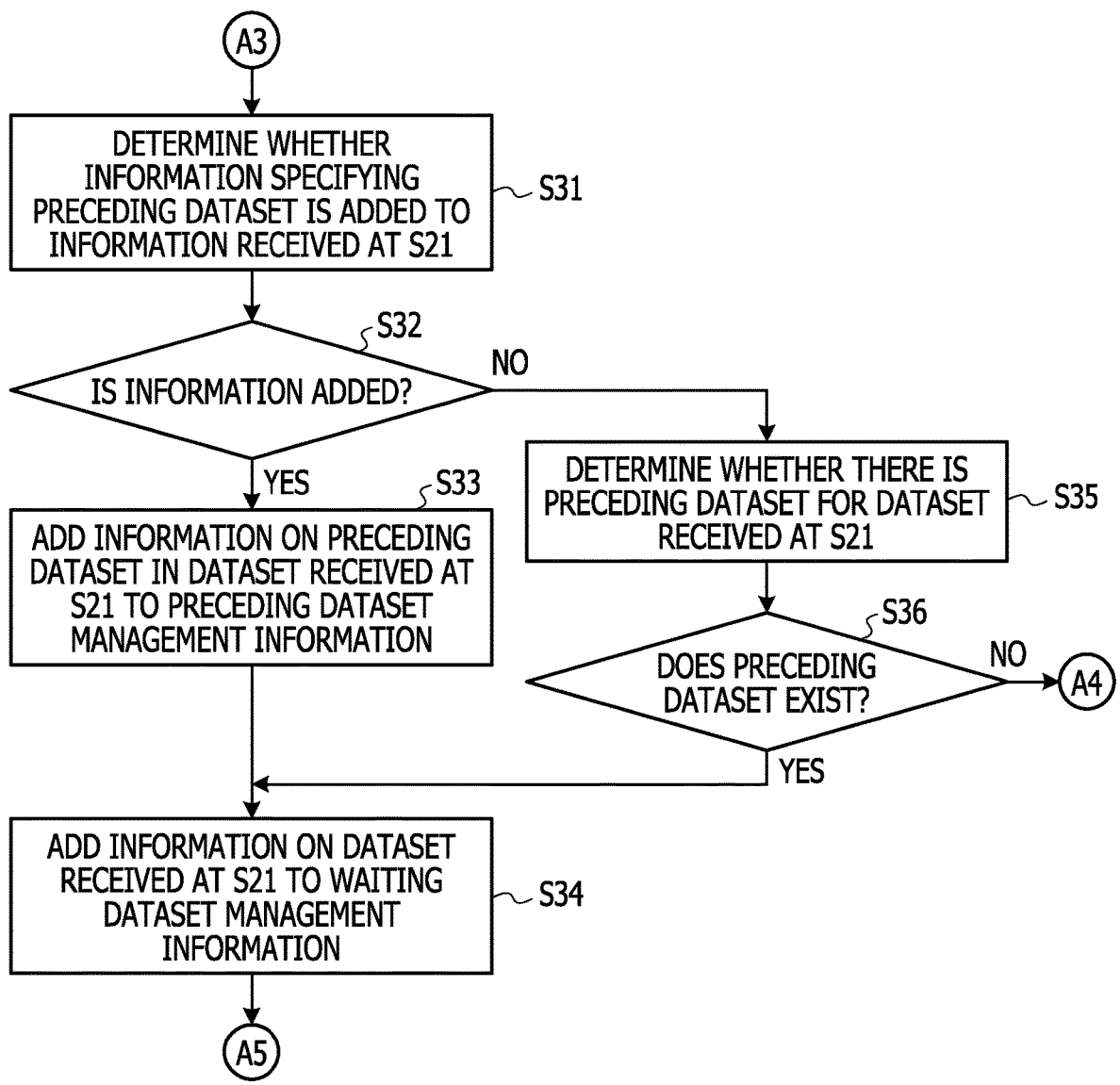
FIG. 13 is a flowchart diagram for explaining the details of the stream data processing in the first embodiment.

Returning to FIG. 12, when determining that the task (the certain task) to process the inter-task dataset DT11 received at S21 is a task to be under the order control (YES at S27), the order control unit 112 determines whether or not information specifying the preceding dataset is added to the dataset (the inter-task dataset DT11) received in the processing at S21 (S31) as illustrated in FIG. 13. Hereinafter, a specific example of the inter-task dataset DT11 will be described.

Specific Example of Inter-Task Dataset

FIG. 21 is a diagram for explaining a specific example of the inter-task dataset DT11 (sensor dataset DT). FIG. 21 is the diagram for explaining the specific example of the inter-task dataset DT11 to which the information specifying the preceding dataset is added.

The inter-task dataset DT11 illustrated in FIG. 21 contains, for example, "dataset ID" for identifying each sensor dataset DT, "timestamp" for indicating a time at which each sensor dataset DT was generated in a sensor (not illustrated), and "transmission destination task ID" for identifying a transmission destination task of each sensor dataset DT. The inter-task dataset DT11 illustrated in FIG. 21 contains, for example, "preceding dataset ID" for identifying a preceding dataset for each sensor dataset DT, and "data (1)" and "data (2)" for setting data pieces in each sensor dataset DT.

For example, in the inter-task dataset DT11 illustrated in FIG. 21, "123456" is set as the "dataset ID", "123456789" is set as the "timestamp", "#3" is set as the "transmission destination task ID", "234567" is set as the "preceding dataset ID", "60" is set as the "data (1)", and "120" is set as the "data (2)".

For example, the inter-task dataset DT11 illustrated in FIG. 21 indicates that the inter-task dataset DT11 is the sensor dataset DT transmitted from the task #2 to the task #3, and is the sensor dataset DT transmitted before the preceding dataset with the "dataset ID" of "234567".

Accordingly, for example, when the inter-task dataset DT11 illustrated in FIG. 21 is received in the processing at S21, the order control unit 112 determines that the information specifying the preceding dataset (the information on the "preceding dataset ID") is added to the inter-task dataset DT11 received in the processing at S21.

Returning to FIG. 13, when determining that the information specifying the preceding dataset is added to the inter-task dataset DT11 received in the processing at S21 (YES at S32), the order control unit 112 adds, to the preceding dataset management information 134, the information on the preceding dataset added to the dataset received in the processing at S21 (S33).

On the other hand, when determining that the information specifying the preceding dataset is not added to the inter-task dataset DT11 received in the processing at S21 (NO at S32), the order control unit 112 refers to the preceding dataset management information 134 stored in the information storage area 130 and thereby determines whether or not there is a preceding dataset for the dataset received in the processing at S21 (S35).

When determining as a result that there is the preceding dataset for the dataset received in the processing at S21 (YES at S36), or after the processing at S33, the order control unit 112 adds the information on the inter-task dataset DT11 received in the processing at S21 to the waiting dataset management information 133 (S34). The waiting dataset management information 133 is information for managing a waiting dataset in each task. The waiting dataset is a sensor dataset DT that reaches each task before the preceding dataset, and is, for example, a sensor dataset DT on which the execution of the task at the previous stage had been completed before that of the preceding dataset. Hereinafter, a specific example of the waiting dataset management information 133 will be described.

Specific Example of Waiting Dataset Management Information

FIG. 22 is a diagram for explaining a specific example of the waiting dataset management information 133.

The waiting dataset management information 133 illustrated in FIG. 22 contains "task ID" for identifying each task, "dataset ID" for identifying each sensor dataset DT as a waiting dataset, "preceding dataset ID" for identifying a preceding dataset for each waiting dataset, "timestamp" indicating a time at which each waiting dataset was generated in a sensor, and "data (1)" and "data (2)" for setting data pieces in each waiting dataset.

For example, in the information in the first row of the waiting dataset management information 133 illustrated in FIG. 22, "#2" is set as the "task ID", "123456" is set as the "dataset ID", "234567" is set as the "preceding dataset ID", "123456789" is set as the "timestamp", "60" is set as the "data (1)", and "120" is set as the "data (2)".

In the information in the second row of the waiting dataset management information 133 illustrated in FIG. 22, "#3" is set as the "task ID", "456789" is set as the "dataset ID", "345678" is set as the "preceding dataset ID", "123456835" is set as the "timestamp", "70" is set as the "data (1)", and "120" is set as the "data (2)".

Figure 14:
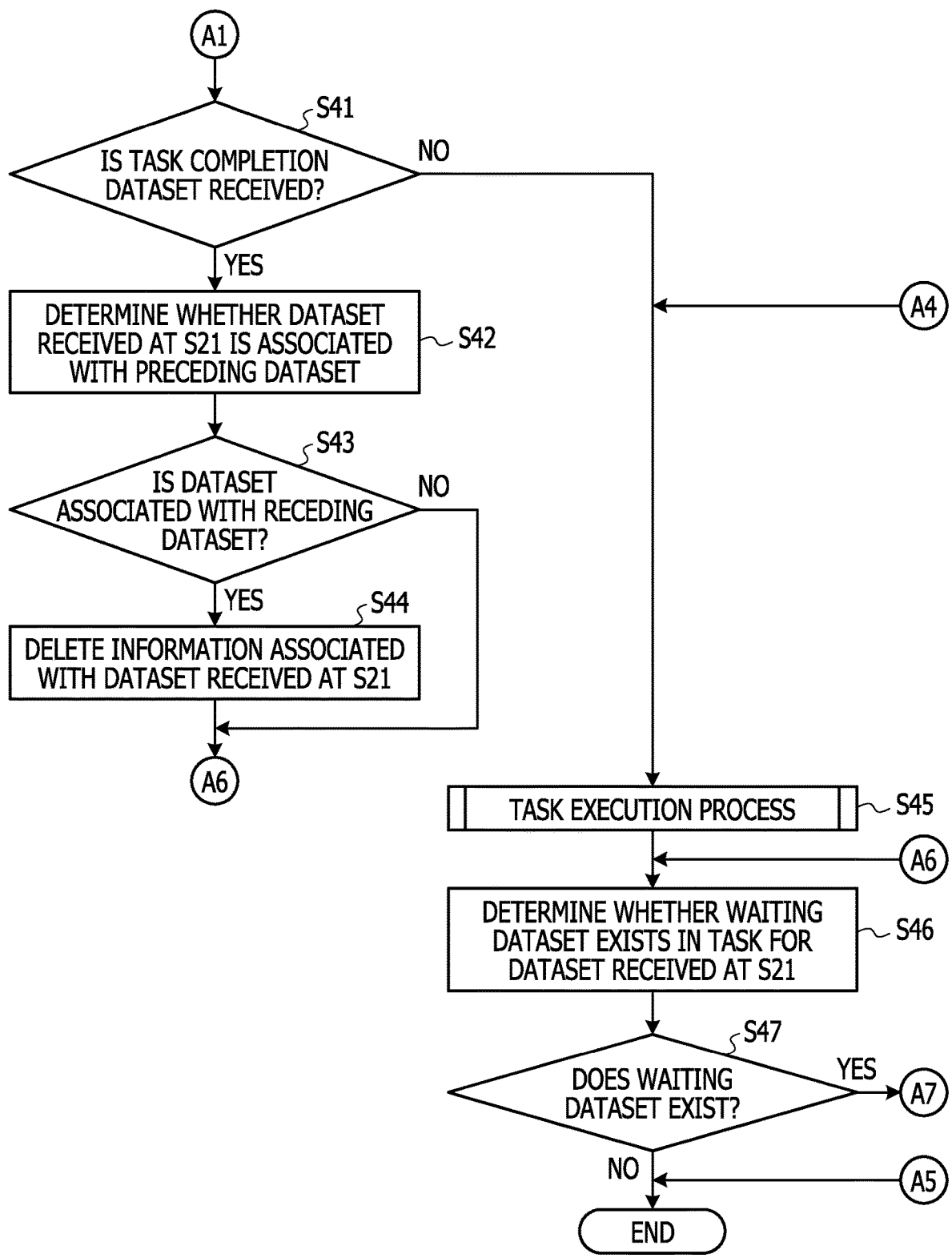
FIG. 14 is a flowchart diagram for explaining the details of the stream data processing in the first embodiment.

Returning to FIG. 12, when determining that the dataset received in the processing at S21 is not the inter-task dataset DT11 (NO at S22), the order control unit 112 determines whether or not the dataset received in the processing at S21 is a task completion dataset DT12 (S41) as illustrated in FIG. 14.

When the order control unit 112 determines as a result that the dataset received in the processing at S21 is not the task completion dataset DT12, for example, determines that the dataset received in the processing at S21 is a response dataset DT14 (NO at S41), the task execution unit 113 performs a task execution process (S45).

Also when determining that the task (the certain task) to process the sensor dataset DT received at S21 is not a task to be under the order control (NO at S27), the task execution unit 113 also performs the processing at S45 in the same manner. Also when determining that there is no preceding dataset for the dataset received in the processing at S21 (NO at S36), the task execution unit 113 also performs the processing at S45 in the same manner. Hereinafter, a specific example of the response dataset DT14 will be described.

Specific Example of Response Dataset

FIG. 23 is a diagram for explaining the specific example of the response dataset DT14.

The response dataset DT14 illustrated in FIG. 23 contains, for example, "task ID" for identifying each task, "dataset ID" for identifying a sensor dataset DT to be processed by using each response dataset DT14, and "timestamp" for identifying a time at which a processing request (hereafter, also referred to as a request) for the response dataset DT14 was made to the external system 20. The response dataset DT14 illustrated in FIG. 23 contains, for example, "index" for identifying a request associated with each response dataset DT14 and "response" for indicating a data content in the response dataset DT14.

For example, in the response dataset DT14 illustrated in FIG. 23, "#2" is set as the "task ID", "234567" is set as the "dataset ID", "123456783" is set as the "timestamp", "1" is set as the "index", and "aaa . . . " is set as the "response".

[Task Execution Process]

Figure 16:
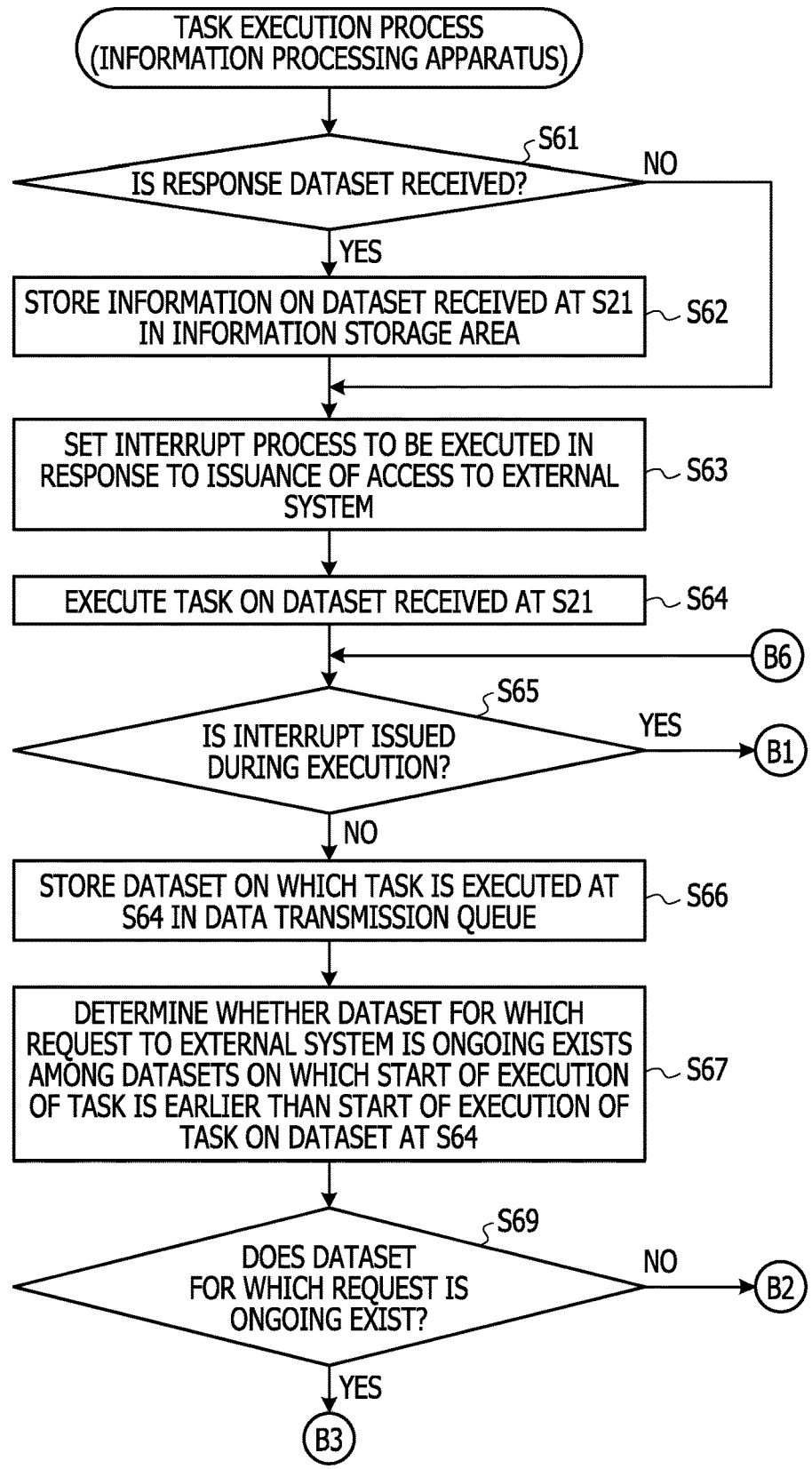
FIG. 16 is a flowchart diagram for explaining the details of the stream data processing in the first embodiment.
Figure 17:
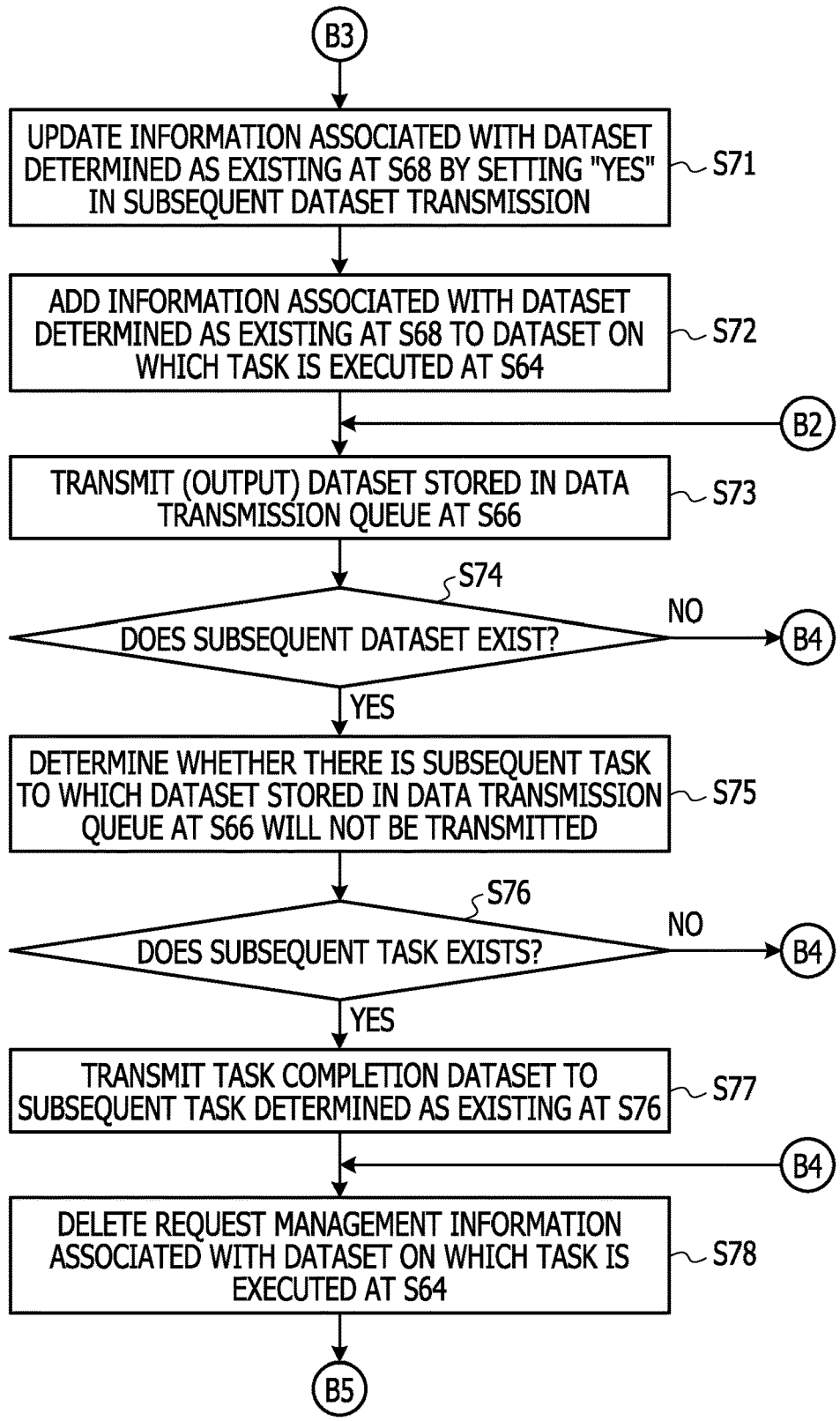
FIG. 17 is a flowchart diagram for explaining the details of the stream data processing in the first embodiment.
Figure 18:
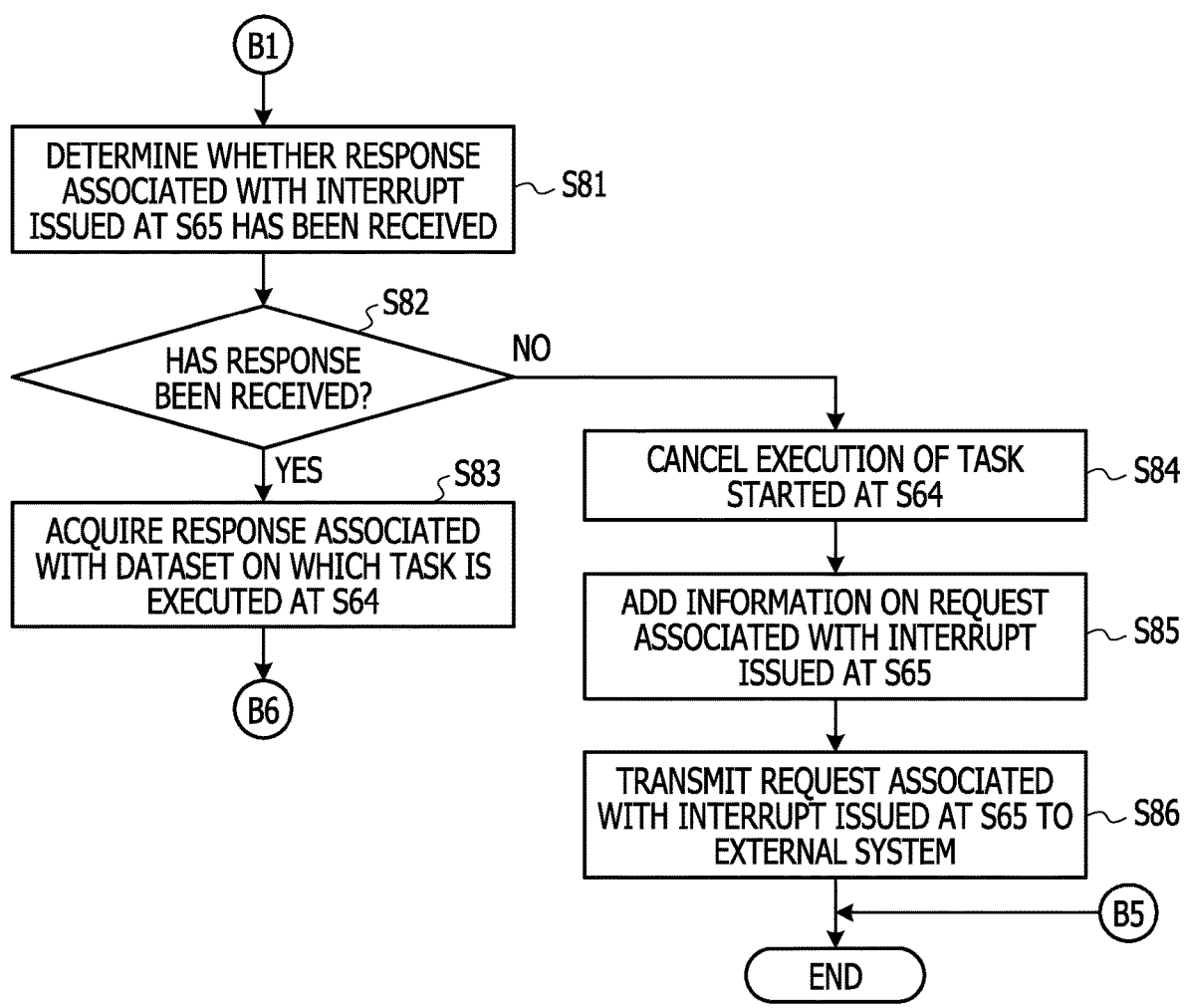
FIG. 18 is a flowchart diagram for explaining the details of the stream data processing in the first embodiment.

Next, the task execution process performed in the processing at S45 will be described. FIGS. 16 to 18 are flowchart diagrams for explaining the task execution process.

As illustrated in FIG. 16, the task execution unit 113 determines whether or not the dataset received in the processing at S21 is a response dataset DT14 (S61).

When the dataset received in the processing at S21 is the response dataset DT14 (YES at S61), the task execution unit 113 stores information on the dataset received in the processing at S21 in the information storage area 130 as the request management information 132 (S62). The request management information 132 is information for managing requests made to the external system 20. Hereinafter, a specific example of the request management information 132 will be described.

Specific Example of Request Management Information

FIGS. 24 and 25 are diagrams for explaining the specific example of the request management information 132.

The request management information 132 illustrated in FIG. 24 and so on contains "task ID" for identifying each task, "dataset ID" for identifying each sensor dataset DT, "timestamp" for identifying a time at which a request to the external system 20 was made along with execution of the task on each sensor dataset DT, and "subsequent dataset transmission" for indicating whether or not another sensor dataset DT subsequent to each sensor dataset DT as a preceding dataset was transmitted to a task at the subsequent stage. In the "subsequent dataset transmission", "YES" is set which indicates that another sensor dataset DT subsequent to each sensor dataset DT as a preceding dataset was transmitted to a task at the subsequent stage or "NO" is set which indicates that another sensor dataset DT subsequent to each sensor dataset DT as a preceding dataset was not transmitted to a task at the subsequent stage.

The request management information 132 illustrated in FIG. 24 and so on contains "index" for identifying a request to the external system 20 made for each sensor dataset DT, "status" for indicating a status of each request, "request destination" for setting an address of the external system 20 to which each request was made, and "response" for setting the content of a response to each request. In the "status", "requesting" is set which indicates that a response to each request has not been received or "received" is set which indicates that a response to each request has been received.

For example, in the information in the first row of the request management information 132 illustrated in FIG. 24, "#2" is set as the "task ID", "234567" is set as the "dataset ID", "123456781" is set as the "timestamp", and "NO" is set as the "subsequent dataset transmission". In the information in the first row of the request management information 132 illustrated in FIG. 24, "1" is set as the "index", "received" is set as the "status", "http:// . . . " is set as the "request destination", and "aaa . . . " is set as the "response".

In the information in the second row of the request management information 132 illustrated in FIG. 24, "#2" is set as the "task ID", "234567" is set as the "dataset ID", "123456783" is set as the "timestamp", and "NO" is set as the "subsequent dataset transmission". In the information in the second row of the request management information 132 illustrated in FIG. 24, "2" is set as the "index", "requesting"

is set as the "status", "http:// . . . " is set as the "request destination", and "-" is set as the "response".

For example, the request management information 132 illustrated in FIG. 24 indicates that requests were respectively transmitted to two different external systems 20 along with execution of the task on the sensor dataset DT with the "dataset ID" of "234567". The request management information 132 illustrated in FIG. 24 indicates that a response from the first external system 20 has been received, while a response from the second external system 20 has not been received.

In the information in the third row of the request management information 132 illustrated in FIG. 24, "#3" is set as the "task ID", "345678" is set as the "dataset ID", "123456832" is set as the "timestamp", and "NO" is set as the "subsequent dataset transmission". In the information in the third row of the request management information 132 illustrated in FIG. 24, "1" is set as the "index", "received" is set as the "status", "http:// . . . " is set as the "request destination", and "bbb . . . " is set as the "response".

Returning to FIG. 16, when the dataset received in the processing at S21 is not the response dataset DT14 (NO at S61), the task execution unit 113 skips the processing at S62.

The task execution unit 113 sets an interrupt process to be executed in response to the issuance of an access to the external system 20 (S63).

For example, the task execution unit 113 sets the interrupt process to be executed in response to the issuance of an access to the external system 20 on an operating system (OS) running on the information processing apparatus 1.

After that, the task execution unit 113 executes the task on the dataset received in the processing at S21 (S64).

For example, when the dataset received in the processing at S21 is the inter-task dataset DT11, the task execution unit 113 executes the task on the inter-task dataset DT11 received in the processing at S21. In a case where the dataset received in the processing at S21 is the response dataset DT14, the task execution unit 113 executes the task on the sensor dataset DT to be processed by using the response dataset DT14 received in the processing at S21.

During the execution of the task in the processing at S64, the access detection unit 114 determines whether or not the interrupt process set in the processing at S63 is performed (S65).

When determining as a result that the interrupt process set in the processing at S63 is not performed, for example, determining that a request to the external system 20 is not occurred during the execution of the task in the processing at S64 (NO at S65), the task execution unit 113 stores the sensor dataset DT on which the task is executed in the processing at S64 in a data transmission queue (not illustrated) (S66).

After that, the task execution unit 113 refers to the request management information 132 stored in the information storage area 130, and thereby determines whether or not a sensor dataset DT for which the request to the external system 20 is ongoing exists among sensor datasets DT on which the start of the execution of the task is earlier than the start of the execution of the task on the sensor dataset DT in the processing at S64 (S67).

For example, in the information in the second row of the request management information 132 described with reference to FIG. 24, "#2" is set as the "task ID", "234567" is set as the "dataset ID", "123456783" is set as the "timestamp", and "requesting" is set as the "status".

For this reason, for example, when the certain task is the task #2 and the execution of the task on a sensor dataset DT (inter-task dataset DT11) with the "timestamp" set to a time later than "123456783" is started in the processing at S64, the task execution unit 113 determines that the sensor dataset DT with the "dataset ID" of "234567" exists as the sensor dataset DT on which the start of the execution of the task is earlier than the start of the execution of the task on the sensor dataset DT in the processing at S64 and for which the access to the external system 20 is in execution.

When the task execution unit 113 determines that the sensor dataset DT for which the request to the external system 20 is ongoing exists among the sensor datasets DT on which the start of the execution of the task is earlier than the start of the execution of the task on the sensor dataset DT in the processing at S64 (YES at S68), the task execution unit 113 refers to the request management information 132 stored in the information storage area 130 and thereby updates the information associated with the sensor dataset DT determined as existing in the processing at S68 to indicate the subsequent dataset is transmitted (S71) as illustrated in FIG. 17.

For example, when determining that the sensor dataset DT with the "dataset ID" of "234567" exists in the processing at S68, the task execution unit 113 updates the "subsequent dataset transmission" to "YES" in the information associated with the sensor dataset DT with the "dataset ID" of "234567" (the information in the first row and the second row) as indicated with underlined portions in FIG. 25.

After that, the task execution unit 113 adds the information on the sensor dataset DT determined as existing in the processing at S68 to the sensor dataset DT on which the task is executed in the processing at S64 (S72).

For example, the dataset ID of the sensor dataset DT determined as existing in the processing at S68 among the sensor datasets DT stored in the data transmission queue in the processing at S66 is set as the preceding dataset ID of the sensor dataset DT on which the task is executed in the processing at S64.

After that, the data transmission unit 117 transmits (outputs) the sensor dataset DT stored in the data transmission queue in the processing at S66 (S73).

For example, the data transmission unit 117 transmits the sensor dataset DT stored in the data transmission queue in the processing at S66 to the task at the subsequent stage. The data transmission unit 117 outputs the sensor dataset DT stored in the data transmission queue in the processing at S66 as a final result to the operation terminal (not illustrated).

The task execution unit 113 refers to the request management information 132 stored in the information storage area 130, and thereby determines whether or not there is a dataset subsequent to the sensor dataset DT transmitted in the processing at S73 (S74).

For example, the task execution unit 113 refers to the request management information 132 stored in the information storage area 130, and thereby determines whether or not "YES" is set in the "subsequent dataset transmission" in the information associated with the sensor dataset DT transmitted in the processing at S73.

When determining as a result that there is a dataset subsequent to the sensor dataset DT transmitted in the processing at S73 (YES at S74), the task execution unit 113 determines whether or not there is a subsequent task to which the sensor dataset DT stored in the data transmission queue in the processing at S66 will not be transmitted (S75).

For example, in the second row of the task management information 131 illustrated in FIG. 20, "task T12" is set as the "task name", "#2" is set as the "task ID", and "#3" and "#4" are set as the "transmission destination task ID". In this case, for example, if the transmission destination task of the sensor dataset DT transmitted in the processing at S73 is the task #3, the task execution unit 113 determines the task #4 as a subsequent task to which the sensor dataset DT stored in the data transmission queue in the processing at S66 will not be transmitted.

When determining that there is the subsequent task to which the sensor dataset DT stored in the data transmission queue in the processing at S66 will not be transmitted (YES at S76), the task execution unit 113 transmits the task completion dataset DT12 to the subsequent task determined as existing in the processing at S76 (S77).

For example, the task execution unit 113 transmits the task completion dataset DT12 to the subsequent task to which the sensor dataset DT stored in the data transmission queue in the processing at S66 will not be transmitted so that the subsequent task to which the sensor dataset DT stored in the data transmission queue in the processing at S66 will not be transmitted may not continuously wait for the execution result of the task in the processing at S64. Hereinafter, a specific example of the task completion dataset DT12 will be described.

Specific Example of Task Completion Dataset

FIG. 26 is a diagram for explaining a specific example of the task completion dataset DT12.

The task completion dataset DT12 illustrated in FIG. 26 contains, for example, "transmission destination task ID" for identifying a transmission destination task of each task completion dataset DT12, "dataset ID" for identifying a sensor dataset ID associated with each task completion dataset DT12, and "timestamp" for indicating a time at which the sensor dataset ID associated with each task completion dataset DT12 was generated in a sensor (not illustrated).

For example, in the task completion dataset DT12 illustrated in FIG. 26, "#4" is set as the "transmission destination task ID", "234567" is set as the "dataset ID", and "123456780" is set as the "timestamp".

Returning to FIG. 17, the task execution unit 113 deletes the request management information 132 associated with the sensor dataset DT on which the task is executed in the processing at S64 (S78).

Also when determining that there is no dataset subsequent to the sensor dataset DT transmitted in the processing at S73 (NO at S74) and when determining that there is no subsequent task to which the dataset on which the task is executed in the processing at S64 will not be transmitted (NO at S76), the task execution unit 113 executes the processing at S78 in the same manner.

On the other hand, when the interrupt process set in the processing at S63 is performed during the execution of the task in the processing at S64 (YES at S65), the task execution unit 113 refers to the request management information 132 stored in the information storage area 130, and thereby determines whether or not a response for the sensor dataset DT during the execution of the task in the processing at S64 has been received (S81) as illustrated in FIG. 18.

For example, the task execution unit 113 refers to the request management information 132 stored in the information storage area 130, and thereby determines whether or not "received" is set in all the information in the "status" in the information in which the information set in the "dataset ID" is the same as the sensor dataset DT during the execution of the task in the processing at S64.

When determining that the response for the sensor dataset DT during the execution of the task in the processing at S64 has been received (YES at S82), the task execution unit 113 refers to the request management information 132 stored in the information storage area 130, and thereby acquires the response for the sensor dataset DT during the execution of the task in the processing at S64 (S83).

For example, the task execution unit 113 refers to the request management information 132 stored in the information storage area 130, and acquires all the information set in the "response" in the information in which the information set in the "dataset ID" is the same as the sensor dataset DT during the execution of the task in the processing at S64.

After that, the task execution unit 113 performs the processing at S65 and the subsequent steps again. For example, using the response acquired in the processing at S83, the task execution unit 113 continues the execution of the task, the execution of which is started in the processing at S64.

On the other hand, when determining that the response for the dataset during the execution of the task in the processing at S64 has not been received (NO at S82), the task execution unit 113 cancels the execution of the task, the execution of which is started in the processing at S64 (S84).

The task execution unit 113 adds the information on the request for which the interrupt is occurred in the processing at S65 to the request management information 132 stored in the information storage area 130 (S85).

After that, the external instruction unit 115 transmits, to the external system 20, the request dataset DT13 for making the request for which the interrupt is occurred in the processing at S65 (S86).

For example, when an access to the external system 20 is occurred, the task execution unit 113 cancels the execution of the task on the sensor dataset DT and causes the external instruction unit 115 to execute the access to the external system 20. After receiving an access result from the external system 20, the task execution unit 113 re-executes the task on the sensor dataset DT, which has been cancelled and is temporarily suspended, without accessing the external system 20.

In this way, the information processing apparatus 1 is capable of reducing the influence of a processing delay due to the issuance of an access to the external system 20 on the processing (stream processing) in the task execution unit 113. For this reason, the information processing apparatus 1 is capable of suppressing a decrease in the processing speed for a sensor dataset DT that does not involve an access to the external system 20. Hereinafter, a specific example of the request dataset DT13 will be described.

Specific Example of Request Dataset

FIG. 27 is a diagram for explaining a specific example of the request dataset DT13.

The request dataset DT13 illustrated in FIG. 27 contains, for example, "task ID" for identifying each task, "dataset ID" for identifying a sensor dataset DT for which a request associated with the request dataset DT13 was made, and "timestamp" for identifying a time at which each request was made. The request dataset DT13 illustrated in FIG. 27 contains, for example, "index" for identifying each request and "request" for indicating a data content in the request dataset DT13.

For example, in the request dataset DT13 illustrated in FIG. 27, "#2" is set as the "task ID", "234567" is set as the "dataset ID", "123456781" is set as the "time stamp", "1" is set as the "index", and "HTTP GET http:// . . . " is set as the "request".

Returning to FIG. 14, when determining that the dataset received in the processing at S21 is the task completion dataset DT12 (YES at S41), the order control unit 112 determines whether or not the task completion dataset DT12 received in the processing at S21 is the task completion dataset DT12 associated with the preceding dataset (S42).

For example, the order control unit 112 refers to the preceding dataset management information 134 stored in the information storage area 130, and thereby determines whether or not there is information associated with the task completion dataset DT12 received in the processing at S21. When determining as a result that the information associated with the task completion dataset S21 received in the processing in DT12 exists, the order control unit 112 determines that the task completion dataset DT12 received in the processing at S21 is the task completion dataset DT12 associated with the preceding dataset.

When the task completion dataset S21 received in the processing of DT12 is the task completion dataset DT12 associated with the preceding dataset (YES at S43), the order control unit 112 refers to the preceding dataset management information 134 stored in the information storage area 130, and deletes the information associated with the task completion dataset DT12 received in the processing at S21 (S44).

On the other hand, when the dataset received in the processing at S21 is not the task completion dataset DT12 associated with the preceding dataset (NO at S43), the order control unit 112 skips the processing at S44.

After that, the order control unit 112 refers to the waiting dataset management information 133 stored in the information storage area 130, and thereby determines whether or not a waiting dataset exists in the task for the dataset received in the processing at S21 (S46). Also when the processing at S45 is performed, the order control unit 112 performs the processing at S46 in the same manner.

Figure 15:
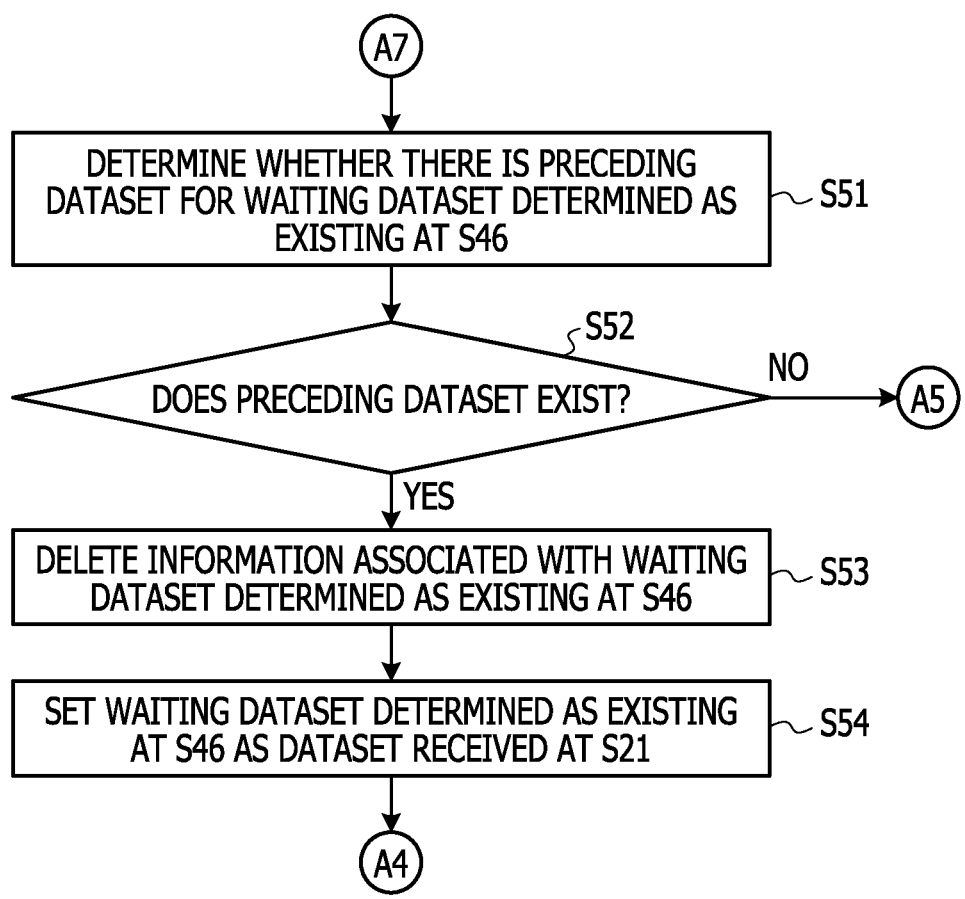
FIG. 15 is a flowchart diagram for explaining the details of the stream data processing in the first embodiment.

When determining that the waiting dataset exists in the task for the dataset received in the processing at S21 (YES at S47), the order control unit 112 determines whether or not there is a preceding dataset for the waiting dataset determined as existing in the processing at S46 (S51), as illustrated in FIG. 15.

When determining as a result that there is the preceding dataset for the waiting dataset determined as existing in the processing at S46 (YES at S52), the order control unit 112 refers to the waiting dataset management information 133 stored in the information storage area 130, and deletes the information associated with the waiting dataset determined as existing in the processing at S46 (S53).

After that, the order control unit 112 sets the waiting dataset determined as existing in the processing at S46 as the dataset received in the processing at S21 (S54). The order control unit 112 performs the processing at S45 and the subsequent steps again.

As described above, for example, in response to reception of a first sensor dataset DT containing information on an event, the information processing apparatus 1 according to the present embodiment starts to execute a first task on the received first sensor dataset DT. When the execution of the first task on the first sensor dataset DT involves execution of a first process that requests an access to an external system, the information processing apparatus 1 cancels the execution of the first task on the first sensor dataset DT and accesses the external system for the first process.

Subsequently, in response to reception of a second sensor dataset DT containing information on an event, the information processing apparatus 1 starts to execute the first task on the received second sensor dataset DT. When the execution of the first task on the second sensor dataset DT does not involve the first process, the information processing apparatus 1 continues the execution of the first task on the second sensor dataset DT.

After that, in a case where an access result is received from the external system, the information processing apparatus 1 executes the first task on the first sensor dataset DT again after the execution of the first task on the second sensor dataset DT is completed.

For example, when an access to the external system 20 is occurred along with the execution of the first task on the first sensor dataset DT, the information processing apparatus 1 cancels the execution of the first task on the first sensor dataset DT and makes the occurred access to the external system 20 asynchronously with the execution of the first task on the first sensor dataset DT. Without waiting for the access result from the external system, the information processing apparatus 1 executes the first task sequentially on sensor datasets DT (including the second sensor dataset DT) generated after the first sensor dataset DT. Then, when the access result is received from the external system 20, the information processing apparatus 1 re-executes the first task on the first sensor dataset DT from the beginning by using the received access result.

In this way, for example, the information processing apparatus 1 is capable of reducing a waiting time for a barrier marker, which occurs due to an access to the external system 20. Thus, the information processing apparatus 1 is capable of suppressing a decrease in the processing speed of a task on a sensor dataset DT that does not involve an access to the external system 20.

The above embodiments are summarized as following appendices.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a data stream processing program that causes a processor included in a computer to perform stream processing on a data stream, the stream processing including a task execution process and an external instruction process,
the external instruction process comprising:
making an access to another information processing system instead of the task execution process, and
receiving, from the another information processing system, an access result for the access, the access result including a response dataset,
the task execution process comprising:
in response to receiving, as a part of the data stream, a first sensor dataset containing information on an event measured by a first sensor, starting to execute a first task on the received first sensor dataset;

when execution of the first task on the first sensor dataset involves execution of a first process that requests the access to the another information processing system to obtain the response dataset, cancelling the execution of the first task on the first sensor dataset, and causing the external instruction process to make the access to the another information processing system for the first process;

in response to receiving, as a part of the data stream, a second sensor dataset containing information on an event measured by a second sensor, starting to execute the first task on the received second sensor dataset;

continuing the execution of the first task on the second sensor dataset when the execution of the first task on the second sensor dataset does not involve execution of the first process; and when the external instruction process receives the access result for the access without re-executing the access to the another information processing system, re-executing the first task on the first sensor dataset after the execution of the first task on the second sensor dataset is completed, wherein the re-executing of the first task on the first sensor dataset includes re-executing the first task including a process having been completed before the cancelling the execution of the first task on the first sensor dataset, in the re-executing of the first task, performing the first process without re-executing the access to another information processing system, by using the response dataset included in the access result already received from the another information processing system by the external instruction process.

2. The non-transitory computer-readable storage medium according to claim 1, wherein the re-executing includes re-executing the first task on the first sensor dataset including a process having been completed before the cancellation of the execution of the first task on the first sensor dataset in the cancelling the execution.

3. The non-transitory computer-readable storage medium according to claim 1, wherein the process further comprising:

determining, when the second sensor dataset is specific type of data, whether or not the specific type of data has been received from all other tasks which transmit sensor datasets on which the first task is to be executed, and starting to execute the first task on the second sensor dataset when it is determined that the specific type of data has been received from all the other tasks.

4. The non-transitory computer-readable storage medium according to claim 3, wherein the process further comprising:

waiting the starting to execute the first task on the second sensor dataset until the specific type of data is received from all the other tasks when it is determined that the specific type of data has not been received from all the other tasks.

5. A data stream processing system comprising:

one or more information processing apparatuses each of which is configured to access each other, wherein each of the one or more information processing apparatuses includes a memory and a processor coupled to the memory, the processor being configured to perform stream processing on a data stream, the stream processing including a task execution process and an external instruction process, the external instruction process comprising:

making an access to another information processing system instead of the task execution process, and receiving, from the another information processing system, an access result for the access, the access result including a response dataset, the task execution process comprising:

in response to receiving, as a part of the data stream, a first sensor dataset containing information on an event measured by a first sensor, starting to execute a first task on the received first sensor dataset, when execution of the first task on the first sensor dataset involves execution of a first process that requests the access to the another information processing system to obtain the response dataset, canceling the execution of the first task on the first sensor dataset, and causing the external instruction process to make the access to the another information processing system for the first process, in response to receiving, as a part of the data stream, a second sensor dataset containing information on an event measured by a second sensor, start to execute the first task on the received second sensor dataset, continue the execution of the first task on the second sensor dataset when the execution of the first task on the second sensor dataset does not involve execution of the first process, and when the external instruction process receives the access result for the access without re-executing the access to the another information processing system, re-execute the first task on the first sensor dataset after the execution of the first task on the second sensor dataset is completed, wherein the re-executing of the first task on the first sensor dataset includes re-executing the first task including a process having been completed before the cancelling the execution of the first task on the first sensor dataset, in the re-executing of the first task, performing the first process without re-executing the access to another information processing system, by using the response dataset included in the access result already received from the another information processing system by the external instruction process.

6. A data stream processing method implemented by a computer configured to perform stream processing on a data stream, the stream processing including a task execution process and an external instruction process, the data processing method comprising:

in the external instruction process, making an access to another information processing system instead of the task execution process, and receiving, from the another information processing system, an access result for the access, the access result including a response dataset;

in the task execution process, in response to receiving, as a part of the data stream, a first sensor dataset containing information on an event measured by a first sensor, starting to execute a first task on the received first sensor dataset;

when execution of the first task on the first sensor dataset involves execution of a first process that requests the access to the another information processing system to obtain the response dataset, cancelling the execution of the first task on the first sensor dataset, and causing the external instruction process to make the access to the another information processing system for the first process;

in response to receiving, as a part of the data stream, a second sensor dataset containing information on an event measured by a second sensor, starting to execute the first task on the received second sensor dataset;

continuing the execution of the first task on the second sensor dataset when the execution of the first task on the second sensor dataset does not involve execution of the first process; and when the external instruction process receives the access result for the access without re-executing the access to the another information processing system, re-executing the first task on the first sensor dataset after the execution of the first task on the second sensor dataset is completed, wherein the re-executing of the first task on the first sensor dataset includes re-executing the first task including a process having been completed before the cancelling the execution of the first task on the first sensor dataset, in the re-executing of the first task, performing the first process without re-executing the access to another information processing system, by using the response dataset included in the access result already received from the another information processing system by the external instruction process.

* * * * *